(12) United States Patent
Huh et al.

(10) Patent No.: US 10,454,904 B2
(45) Date of Patent: Oct. 22, 2019

(54) METHOD, APPARATUS AND SYSTEM FOR SECURE DATA COMMUNICATION

(71) Applicant: SAMSUNG ELECTRONICS CO., LTD., Suwon-si (KR)

(72) Inventors: Mi-suk Huh, Suwon-si (KR); Hee-kwan Lee, Seongnam-si (KR); Kwang-pyo Choi, Anyang-si (KR); Chan-yul Kim, Bucheon-si (KR); Seog-chung Seo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 273 days.

(21) Appl. No.: 15/468,567

(22) Filed: Mar. 24, 2017

(65) Prior Publication Data

US 2017/0208045 A1   Jul. 20, 2017

Related U.S. Application Data

(63) Continuation of application No. PCT/KR2015/010073, filed on Sep. 24, 2015.
(Continued)

(30) Foreign Application Priority Data

Sep. 23, 2015   (KR) .......................... 10-2015-0134823

(51) Int. Cl.
*H04L 29/06* (2006.01)
*H04L 9/08* (2006.01)
(Continued)

(52) U.S. Cl.
CPC ........ *H04L 63/0428* (2013.01); *H04L 9/0822* (2013.01); *H04L 9/0825* (2013.01);
(Continued)

(58) Field of Classification Search
CPC ......... H04L 63/0428; H04L 9/30; H04L 9/14; H04L 9/0861; H04L 9/3247;
(Continued)

(56) References Cited

U.S. PATENT DOCUMENTS 6,367,019 B1    4/2002   Ansell et al.
6,760,752 B1 *  7/2004   Liu ..................... H04L 63/0428
(Continued)

FOREIGN PATENT DOCUMENTS

CN    103002439 A    3/2013
EP    2387285 A1     11/2011
(Continued)

OTHER PUBLICATIONS

Zhang et al., "An efficient identity-based batch verification scheme for vehicular sensor networks", IEEE INFOCOM 2008 proceedings, (Year: 2008).*
(Continued)

*Primary Examiner* — Morshed Mehedi
(74) *Attorney, Agent, or Firm* — Sughrue Mion, PLLC

(57) ABSTRACT

The present disclosure relates to technologies for a sensor network, machine-to-machine (M2M) communication, machine type communication (MTC), and an Internet of Things (IoT) network. The present disclosure may be used in intelligence services based on such technologies (smart homes, smart buildings, smart cities, smart cars or connected cars, healthcare, digital education, retail business, and security and safety-related services). Provided is a method of transmitting encrypted data for preventing identification of transmitting and receiving devices, from a first device to a second device, the method including: generating an encryption key for encrypting data; generating key identification information by using the generated encryption key and encrypting the data; and transmitting a data set including the
(Continued)

encrypted data and the key identification information to the second device.

14 Claims, 29 Drawing Sheets

Related U.S. Application Data

(60) Provisional application No. 62/054,499, filed on Sep. 24, 2014.

(51) Int. Cl.
*H04L 9/14* (2006.01)
*H04L 9/30* (2006.01)
*H04L 9/32* (2006.01)

(52) U.S. Cl.
CPC .......... *H04L 9/0841* (2013.01); *H04L 9/0861* (2013.01); *H04L 9/14* (2013.01); *H04L 9/30* (2013.01); *H04L 9/3242* (2013.01); *H04L 9/3247* (2013.01); *H04L 63/061* (2013.01); *H04L 63/0869* (2013.01)

(58) Field of Classification Search
CPC ... H04L 9/3242; H04L 63/061; H04L 9/0841; H04L 9/0825; H04L 9/0822; H04L 63/0869
See application file for complete search history.

(56) References Cited

U.S. PATENT DOCUMENTS

| | | | |
|---|---|---|---|
| 6,904,521 B1* | 6/2005 | Jivsov | H04L 51/30 713/155 |
| 7,627,762 B2 | 12/2009 | Schaefer et al. | |
| 7,730,309 B2 | 6/2010 | Zimmermann | |
| 8,391,484 B2 | 3/2013 | Kwon et al. | |
| 8,462,942 B2 | 6/2013 | Berggren et al. | |
| 8,522,028 B2 | 8/2013 | Brique et al. | |
| 9,119,067 B2 | 8/2015 | Santamaria et al. | |
| 10,205,709 B2* | 2/2019 | John | H04L 63/0428 |
| 2003/0091186 A1 | 5/2003 | Fontijn et al. | |
| 2004/0133520 A1 | 7/2004 | Callas et al. | |
| 2004/0162980 A1* | 8/2004 | Lesenne | H04L 63/0442 713/153 |
| 2005/0058295 A1* | 3/2005 | Kang | H04L 9/0844 380/282 |
| 2005/0169472 A1* | 8/2005 | Han | G06Q 30/06 380/227 |
| 2005/0257059 A1* | 11/2005 | Schaefer | H04L 63/08 713/176 |
| 2006/0005026 A1* | 1/2006 | Song | H04L 9/0844 713/173 |
| 2006/0034462 A1* | 2/2006 | Lee | H04L 9/0869 380/277 |
| 2007/0003066 A1 | 1/2007 | Schwartz et al. | |
| 2007/0223706 A1* | 9/2007 | Gantman | H04L 9/085 380/286 |
| 2011/0113241 A1* | 5/2011 | Umezawa | G06F 21/606 713/156 |
| 2011/0214160 A1* | 9/2011 | Costa | H04L 63/0869 726/3 |
| 2012/0047366 A1* | 2/2012 | Yoo | G06F 21/566 713/171 |
| 2012/0164983 A1 | 6/2012 | Ferrero et al. | |
| 2013/0145160 A1* | 6/2013 | Bursell | G06F 21/6218 713/168 |
| 2014/0012751 A1* | 1/2014 | Kuhn | G06Q 20/36 705/41 |
| 2015/0222430 A1 | 8/2015 | Kim et al. | |
| 2016/0227412 A1* | 8/2016 | Li | H04W 12/08 |
| 2016/0286391 A1* | 9/2016 | Khan | G06Q 20/322 |

FOREIGN PATENT DOCUMENTS

| | | |
|---|---|---|
| JP | 11-143359 A | 5/1999 |
| JP | 2002-353954 A | 12/2002 |
| JP | 2003-502781 A | 1/2003 |
| JP | 2006-191385 A | 7/2006 |
| JP | 2013-42331 A | 2/2013 |
| KR | 10-2004-0004628 A | 1/2004 |
| KR | 10-2007-0109735 A | 11/2007 |
| KR | 10-2010-0061228 A | 6/2010 |
| KR | 10-2011-0023519 A | 3/2011 |
| KR | 10-2011-0056083 A | 5/2011 |
| KR | 10-2014-0025553 A | 3/2014 |
| KR | 10-2014-0026316 A | 3/2014 |
| WO | 2004/063869 A3 | 7/2004 |

OTHER PUBLICATIONS

International Search Report, issued by International Searching Authority in corresponding International Application No. PCT/KR2015/010073, dated Mar. 10, 2016, (PCT/ISA/210).

Written Opinion, issued by International Searching Authority in corresponding International Application No. PCT/KR2015/010073, dated Mar. 10, 2016, (PCT/ISA/237).

* cited by examiner

METHOD, APPARATUS AND SYSTEM FOR SECURE DATA COMMUNICATION

TECHNICAL FIELD

The present disclosure relates to methods, apparatuses, and systems for maintaining security of data communication.

BACKGROUND ART

The Internet is evolving from a human-centered connection network, in which a person generates and consumes information, to an Internet of Things (IoT) network, in which information is exchanged and processed between distributed components, such as objects. An Internet of Everything (IoE) technology, in which a big data processing technology through connection to a cloud server or the like is combined with an IoT technology, is also on the rise. Realization of IoT requires technical elements, such as a sensing technology, a wireless/wired communication and network infrastructure, a service interface technology, and a security technology, and thus recently, technologies for connecting things, such as a sensor network, machine-to-machine (M2M), and machine type communication (MTC), are being studied.

In an IoT environment, an Internet technology (IT) service that creates a new value for human life by collecting and analyzing data generated by connected things may be provided. The IoT may be applied to various fields, such as smart homes, smart buildings, smart cities, smart cars or connected cars, smart grids, healthcare, smart home appliances, and advanced medical care services, through convergence and integration of various industries and the existing information technology (IT).

In particular, devices perform data communication in the IoT environment. Generally, a transmitting device and a receiving device respectively transmits and receives encrypted data, and for the receiving device to decode the encrypted data, information about the transmitting device is required. Accordingly, during the data communication, the transmitting device provides the information about the transmitting device, such as an internet protocol (IP) address, to the receiving device. However, when the information is exposed, a third person may obtain a lot of personal information, such as about the transmitting device, the receiving device, and a communication frequency between the transmitting device and the receiving device, based on the information about the transmitting device, such as the IP address.

Accordingly, demand for technologies enabling only the receiving device, not the third device, to identify the transmitting device through the encrypted data is increasing.

Moreover, in the IoT environment, the transmitting device and the receiving device generate and exchange an encryption key for encrypted data communication. However, since it is common that the transmitting device and the receiving device generate an encryption key based on the same key data, a third device may be able to hack all data exchanged between the transmitting device and the receiving device by hacking one of the transmitting device and the receiving device.

Accordingly, demand for safe encryption key generating and exchanging technologies is increasing.

DETAILED DESCRIPTION OF THE INVENTION

Technical Problem

Provided are safe encryption key generating and exchanging technologies.

Technical Solution

The present disclosure relates to a method of preventing identification of transmitting and receiving devices while encrypted data is exchanged, and in particular, to a method of preventing identification of transmitting and receiving devices while encrypted data is exchanged in a server-type message service, such as an Internet messenger. Also, the present disclosure relates to a safe key generating and exchanging method for encrypted data communication.

Advantageous Effects of the Invention

According to an embodiment of the present disclosure, by providing a method and device for transmitting or receiving encrypted data for preventing identification of a transmitting device and a receiving device, the receiving device may decrypt the encrypted data while information of the transmitting and receiving devices is not exposed to a third person via the encrypted data.

BEST MODE

Figure 1:
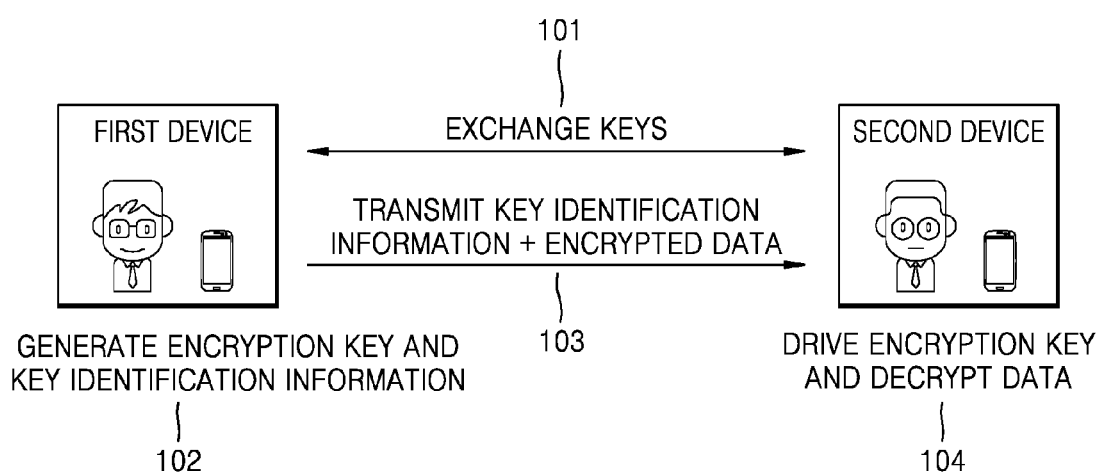
FIG. 1 is a diagram of a device transmitting or receiving encrypted data for preventing identification of transmitting and receiving devices, between a first device and a second device, according to some embodiments.

According to an aspect of an embodiment, a method of transmitting, by a first device, encrypted data, the method includes: generating an encryption key for encrypting data to be transmitted; generating key identification information by using the generated encryption key; encrypting the data to be transmitted by using the generated encryption key; and transmitting a data set including the encrypted data and the key identification information to a second device.

The key identification information may include identification information of the first device, which is identifiable by the second device, or information for identifying the encryption key.

The generating of the encryption key may include: transmitting a public key of the first device and a first nonce to the second device and receiving a public key of the second device and a second nonce from the second device; and generating the encryption key by using the public key of the first device and the public key of the second device, wherein the key identification information may be generated by using the first nonce, the second nonce, and the encryption key, and the key identification information may include information for identifying the first device based on the first nonce or the second nonce.

The generating of the key identification information may include: receiving a public key of the second device from the second device; and generating the key identification information by encrypting the encryption key by using the received public key of the second device.

The generating of the encryption key may include: sharing a secret key with the second device; and generating the encryption key by using the secret key and a first nonce, wherein the key identification information may include the first nonce and a value obtained by key-hashing, by using the first nonce, a value in which the first nonce and the encryption key are combined.

The encryption key may be a nonce smaller than an identification number Pa of the first device and an identification number Pb of the second device, and the key identification information may include a value obtained by adding the nonce to a product or greatest common divisor of the identification number Pa of the first device and the identification number Pb of the second device.

The data set may further include a message authentication code, wherein the message authentication code may be used to determine whether the encryption key obtained by the second device is the same as the encryption key transmitted by the first device.

According to an aspect of another embodiment, a method of receiving, by a second device, encrypted data, the method includes: receiving a data set including encrypted data and key identification information from a first device; obtaining an encryption key with respect to the first device by using the key identification information; decrypting the encrypted data by using the obtained encryption key.

The key identification information may include information of the first device, which is identifiable by the second device, and information for identifying the encryption key.

The method may further include receiving each of at least one public key and at least one nonce from at least one device including the first device, and transmitting a public key of the second device and a second nonce to each of the at least one device, wherein the obtaining of the encryption key with respect to the first device may include: generating at least one encryption key with respect to the at least one device by using the received at least one public key and the public key of the second device; generating at least one piece of key identification information by using the at least one encryption key; identifying the first device that transmitted the encrypted data by comparing the generated at least one piece of key identification information and the received key identification information; and obtaining the encryption key with respect to the identified first device.

The method may further include transmitting the public key of the second device to the first device, wherein the obtaining of the encryption key with respect to the first device may include obtaining the encryption key by decrypting the key identification information comprised in the received data set by using a private key corresponding to the public key of the second device.

The method may further include sharing at least one secret key with at least one device including the first device, wherein the receiving of the data set may include receiving encrypted data and key identification information from the first device from among the at least one device, the key identification information may include a first nonce of the first device and a value obtained by key-hashing the encryption key by using the first nonce, the encryption key may include information generated by combining the first nonce and a secret key shared with the first device, and the obtaining of the encryption key with respect to the first device may include: generating at least one matching key by key-hashing, by using the first nonce, each of at least one value in which the at least one secret key and the first nonce are combined; identifying the first device that transmitted the data set by comparing the generated at least one matching key and a value obtained by key-hashing the encryption key by using the first nonce; and obtaining the encryption key of the first device.

The encryption key may be determined based on at least one of a quotient or a remainder obtained by dividing the key identification information by an identification number of the second device.

The data set may further include a message authentication code, wherein the message authentication code may be used to determine whether the obtained encryption key is the same as the encryption key transmitted by the first device.

According to an aspect of another embodiment, a non-transitory computer-readable recording medium has recorded thereon a program which, when executed by a computer, performs the method.

According to an aspect of another embodiment, a first device transmitting encrypted data, the first device includes: a controller configured to generate an encryption key, generate key identification information by using the generated encryption key, and encrypt data; a transceiver configured to transmit a data set including the encrypted data and the key identification information to a second device.

The key identification information may include information of the first device, which is identifiable by the second device, and information for identifying the encryption key.

The transceiver may be further configured to transmit a public key of the first device and a first nonce to the second device, and receive a public key of the second device and a second nonce from the second device, the controller may be further configured to generate the encryption key by using the public key of the first device and the public key of the second device, the key identification information may be generated by using the first nonce, the second nonce, and the encryption key, and the key identification information may include information for identifying the first device based on the first nonce or the second nonce.

The transceiver may be further configured to receive a public key of the second device from the second device, and the key identification information generated by encrypting the encryption key by using the public key of the second device.

The transceiver may be further configured to share a secret key with the second device, the controller may be further configured to generate the encryption key by using the secret key and the first nonce, and the key identification information may include the first nonce and a value obtained by key-hashing a value, in which the first nonce and the encryption key are combined, by using the first nonce.

The encryption key may include a nonce smaller than an identification number of the first device and an identification number of the second device, and the key identification information may include a value obtained by adding the nonce to a product or greatest common divisor of the identification number of the first device and the identification number of the second device.

According to an aspect of another embodiment, a second device receiving encrypted data, the second device includes: a transceiver configured to receive, from a first device, a data set including encrypted data and key identification information; and a controller configured to obtain an encryption key by using the key identification information, and decrypt the received encrypted data by using the encryption key, wherein the key identification information may include information of the first device, which is identifiable by the second device, or information for identifying the encryption key.

The transceiver may be further configured to receive each of at least one public key and at least one nonce from at least one device including the first device, and additionally transmit a public key of the second device and a second nonce to each of the at least one device, and the controller may be further configured to generate at least one encryption key with respect to the at least one device by using the received at least one public key and the public key of the second device, generate at least one piece of key identification information by using the at least one encryption key, identify the first device by comparing the generated at least one piece of key identification information and the received key identification information, and obtain an encryption key with respect to the identified first device.

The transceiver may be further configured to additionally transmit a public key of the second device to the first device, and the controller may be further configured to obtain the encryption key by decrypting the key identification information by using a private key corresponding to a public key of the second device.

The transceiver may be further configured to additionally share at least one secret key from at least one device including the first device, and receive the encrypted data and the key identification information from the first device comprised in the at least one device, the key identification information may include a first nonce received from the first device and a value obtained by key-hashing the encryption key by using the first nonce, the encryption key may include information generated by combining the secret key of the first device and the first nonce, and the controller may be further configured to generate at least one matching key by key-hashing, by using the received first nonce, a value in which the at least one secret key and the first nonce is combined, identify the first device by searching for a value, from among the generated at least one matching key, equal to a value obtained by key-hashing the encryption key by using the first nonce, and obtain the encryption key by using the secret key shared with the first device and the first nonce.

The encryption key may be determined according to a quotient obtained by dividing the key identification information by an identification number of the second device.

According to an aspect of another embodiment, a method of sharing, by a first device, a key for encrypted data transmission, the method includes: determining, based on a communication history, whether a first public key of a first device transmitted to a second device, and a first private key of the first device corresponding to the first public key of the first device, are stored; generating a second public key of the first device and a second private key of the first device based on a result of the determining; signing the generated second public key of the first device with the first private key of the first device; and transmitting the signed second public key to the second device.

The method may further include: receiving, from the second device, a second public key of the second device, which is signed with a first private key of the second device; obtaining a first public key of the second device, which corresponds to the first private key of the second device, based on the communication history; verifying the signed second public key by using the obtained first public key of the second device; and performing encryption communication based on a result of the verifying.

The first public key of the first device and the first private key of the first device may be used during communication between the first device and the second device.

The first public key of the second device and the first private key of the second device may be keys used during previous communication between the first device and the second device.

The performing of the encryption communication based on the result of the verifying may include generating an encryption key based on the result of the verifying or preforming short authentication string (SAS) calculation.

The method may further include deleting the first private key of the first device, the first public key of the first device, and the first public key of the second device.

The determining may include determining whether a first nonce transmitted to the second device during a previous communication is stored based on the communication history, wherein the signing may include signing a second nonce received from the second device during the previous communication based on the communication history, with the first private key of the first device, and the transmitting may include transmitting the signed second nonce.

The receiving of the signed second public key may include receiving a first nonce signed with the first private key of the second device, and the verifying may include verifying the signed first nonce by using the obtained first public key of the second device.

According to an aspect of another embodiment, a non-transitory computer-readable recording medium has recorded thereon a program which, when executed by a computer, performs the method.

According to an aspect of another embodiment, a first device sharing a key for encrypted data transmission, the first device includes: a controller configured to determine, based on a communication history, whether a first public key of a first device transmitted to a second device, and a first private key of the first device, which corresponds to the first public key of the first device, are stored; an encryptor configured to generate a second public key of the first device and a second private key of the first device based on a result of the determination, and sign the generated second public key of the first device with the first private key of the first device; and a communicator configured to transmit the signed second public key to the second device.

The communicator may be further configured to receive, from the second device, a second public key signed with a first private key of the second device, the encryptor may be further configured to obtain a first public key of the second device, which corresponds to the first private key of the second device, based on the communication history, and verify the signed second public key by using the obtained first public key of the second device, and the controller may be further configured to determine whether to perform encryption communication based on a result of the verification.

The first public key of the first device and the first private key of the first device may be keys used during communication between the first device and the second device.

The first public key of the second device and the first private key of the second device may be keys used during previous communication between the first device and the second device.

The encryptor may be further configured to generate an encryption key based on the result of the verification or preform short authentication string (SAS) calculation.

The encryptor may be further configured to delete the first private key of the first device, the first public key of the first device, and the first public key of the second device.

The controller may be further configured to determine whether a first nonce transmitted to the second device during a previous communication based on the communication history is stored, the encrpytor may be further configured to sign a second nonce received from the second device during the previous communication based on the communication history, with the first private key of the first device, and the communicator may be further configured to transmit the signed second nonce.

The communicator may be further configured to receive a first nonce signed by using the first private key of the second device, and the encryptor may be further configured to verify the signed first nonce by using the obtained first public key of the second device.

Mode of the Invention

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

In the specification, when a region is "connected" to another region, the regions may not only be "directly connected", but may also be "electrically connected" via another device therebetween. Also, when a region "includes" an element, the region may further include another element instead of excluding the other element, otherwise differently stated. In the following description, terms such as "unit" and "module" indicate a unit for processing at least one function or operation, wherein the unit and the block may be embodied as hardware or software or embodied by combining hardware and software.

In the specification, examples of a device may include a personal computer, a cellular phone, a smart phone, a television (TV), a tablet computer, a laptop, a personal digital assistant (PDA), a portable multimedia player (PMP), a navigation device, an MP3 player, and a digital camera, but are not limited thereto, and the device may vary.

In the specification, a device key may include a public key (asymmetric key) and may additionally include a secret key (symmetric key). The device key may be data used for encryption communication between devices. The device key may be generated through a key calculation algorithm stored in a device. Examples of the key calculation algorithm may include various algorithms, such as advanced encryption standard (AES), message-digest algorithm 5 (MD5), and elliptic curve Diffie-Helman (ECDH), and are not limited thereto. Since the key calculation algorithm is obvious to one of ordinary skill in the art, details thereof are not provided herein.

In the specification, a key exchange may denote procedures of a first device and a second device transmitting and receiving at least one of a first device key and a second device key. In other words, the key exchange may denote processes of exchanging keys of two devices between the two devices.

In the specification, a key sharing may denote processes of exchanging, between first and second devices, not only first and second device keys, but also a third device key. In other words, the key sharing may denote processes of exchanging a key of another device in addition to keys of two devices. Here, the key sharing may include a concept of the key exchange. In addition, the key sharing may include determining and consenting to a key, transmitting the consented key, and receiving the consented key, but is not limited thereto.

In the specification, a short-range communication method may denote a communication method in which communication is possible only when two devices are within a certain range, and for example, may be Bluetooth or near field communication (NFC), but is not limited thereto.

In the specification, a telecommunication method may denote a communication method in which communication is possible between two devices regardless of a distance therebetween, and may include a communication method using a cellular network, such as a short message service (SMS) or a phone call, but is not limited thereto.

In the specification, a nonce may denote an arbitrary value added to a value input to a function such that a value output by the function varies. For example, when an input value input to a hash function is the same, an output value is the same, and thus in order to vary the output value, a nonce may be added to the input value to calculate the hash function.

In the specification, a nonce of a first device may be referred to as a first nonce and a nonce of a second device may be referred to as a second nonce. For example, an arbitrary value generated when a first device transmits a public key may be a first nonce, and an arbitrary value generated when a second device transmits a public key may be a second nonce.

In the specification, a public key may be distributed to a third person, and may pair up with a private key generated from the public key. Also, the public key and the private key may be asymmetrical keys. In other words, the private key is not distributed to a third person, and data encrypted by using the public key may be decrypted only by using the private key.

In the specification, a secret key is not exposed to a third person and is shared between transmitting and receiving devices, and may be a symmetric key.

In the specification, a data set may denote a set of certain data provided by a data provider and manufactured at a certain time.

In the specification, a hash function (hashing function) is a method of calculating a table address with respect to a certain input value, and may be an equation for calculating an address in which a record is stored based on a given input value. The hash function always outputs the same value with respect to the same input. A feature of the hash function is that it is easy to obtain an output value by using an input value, but impossible to infer the input value from the output value.

In the specification, a keyed hash function may denote a function that requires a key in addition to a basic input value. According to a hash function without a key, anyone who knows a given input value may calculate a hash value, but according to the keyed hash function, even when a given input value is known, only a person who has a key may calculate the hash value. In the specification, a keyed hash function having a key k, i.e. $f_k(x)$ may be represented by $f(k,x)$. Also, in the specification, $f_k(x)$ may be expressed that x is key-hashed by using k. Also, a keyed hash function may be included in a hash function range.

In the specification, an encryption key may include information for encrypting data. Examples of the encryption key may include a scramble key for encrypting an image, but are not limited thereto. The encryption key may be randomly generated, and may be generated by using a public key or secret key of a device transmitting or receiving data. For example, the encryption key may be generated by using a key generated via a Diffie-Hellman (D-H) algorithm during a key exchanging process of first and second devices, but is not limited thereto.

In the specification, key identification information is information identifiable only between a transmitting device transmitting encrypted data, and a receiving device, and the receiving device may decrypt the encrypted data by determining the transmitting device by using the key identification information. However, a third person is unable to obtain information of the transmitting or receiving device from the key identification information. Accordingly, according to an embodiment of the present disclosure, privacy of the transmitting and receiving devices may be guaranteed.

In a general Internet messenger (IM), identification (ID) used in the IM is neither a phone number nor a name, and the ID is mapped to an IM server to transmit data to a receiving device. Thus, even when a third person, who is neither a transmitting device nor the receiving device, captures a packet in the air, it is generally difficult for the third person to determine information of a sender/recipient.

However, even in a communication method using the IM, not all communication processes are performed in a server. The receiving device may be able to check data that is not encrypted in a received packet (for example, message information) without having to perform a separate procedure, but has to perform decryption in order to check encrypted data. Accordingly, in the communication method using the IM, the transmitting device provides data by inserting information of the transmitting device to the data, for decryption. Accordingly, when the third person captures the packet, the third person is unable to decrypt the encrypted data, but may obtain information of the transmitting and receiving devices. Accordingly, according to some embodiments, in order to prevent identification of privacy information, the transmitting and receiving devices may transmit the information of the transmitting and receiving devices after changing or replacing the information such that the third person is unable to recognize the information.

FIG. 1 is a diagram of a device transmitting or receiving encrypted data for preventing identification of transmitting and receiving devices, between a first device and a second device, according to some embodiments.

According to some embodiments, the first device and the second device may respectively be the transmitting device and the receiving device, wherein the first and second devices use key identification information such that a third person is unable to identify information about the transmitting or receiving device.

In operation 101, the first device transmitting data and the second device receiving the data exchange each other's keys. In other words, the first device may receive the key of the second device from the second device and transmit the key of the first device. The key of the first device and the key of the second device may include a public key or a secret key. Also, the first device and the second device may exchange, together with the keys, predetermined values (for example, nonces) generated by the first and second devices.

In operation 102, according to some embodiments, the first device may generate an encryption key. The encryption key may be generated by using a public key or a secret key pre-exchanged with the second device, or may be randomly generated. According to some embodiments, the encryption key may include key data used to encrypt data transmitted between the first and second devices.

Also, in operation 102, the first device may encrypt data to be transmitted by using the encryption key. Also, the first device may generate key identification information. The generating of the key identification information according to some embodiments may be performed before or after the encrypting of the data.

In operation 103, the first device may transmit the key identification information and the encrypted data generated in operation 102. According to some embodiments, the first device may transmit the generated key identification information and the encrypted data together or separately.

In operation 104, the second device may identify the first device by using the received key identification information. Also, the second device may derive the encryption key based on the key identification information. However, a device (for example, a third person) other than the first and second devices is unable to identify the transmitting or receiving device by only using the key identification information.

According to some embodiments, the key identification information may be obtained by encrypting identification information (for example, an identification (ID), a name, a phone number, a key of a device) of the first device, which is identifiable by the second device, to a form recognizable by the second device. Also, according to some embodiments, the key identification information may be generated based on at least one of the key of the first device and the key of the second device, which are exchanged in operation 101, a predetermined value generated by each of the first and second devices, and the encryption key.

Figure 2:
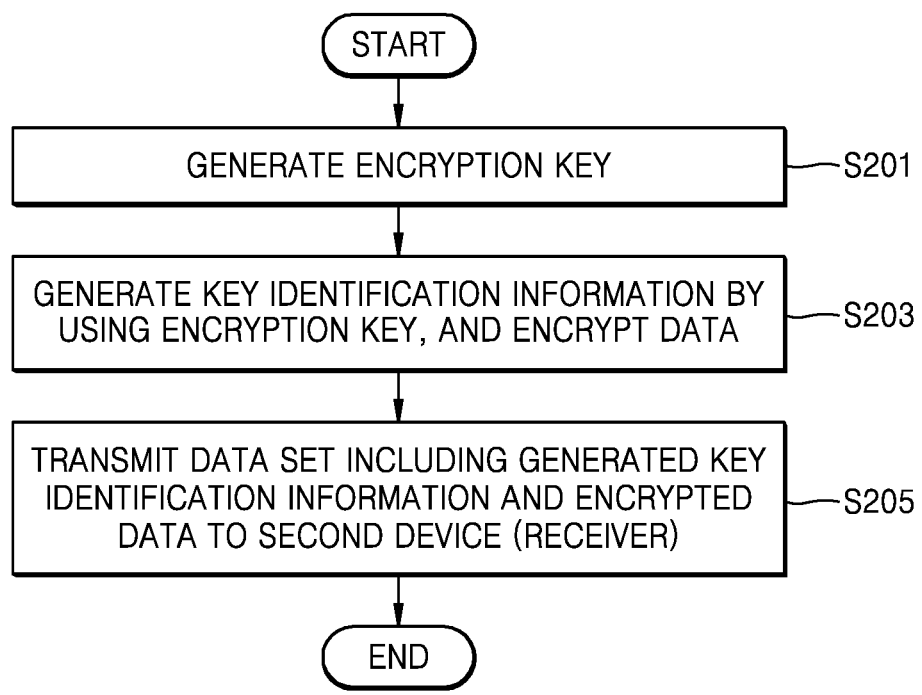
FIG. 2 is a flowchart of a method of transmitting encrypted data for preventing identification of transmitting and receiving devices, from a first device to a second device, according to some embodiments.

FIG. 2 is a flowchart of a method of transmitting encrypted data for preventing identification of transmitting and receiving devices, from a first device to a second device, according to some embodiments.

In operation 201, the first device generates an encryption key. The encryption key may be generated based on a key of the first device transmitted to the second device or a key of the second device received from the second device, or may be generated based on a nonce.

Also, according to some embodiments, the first device and the second device may exchange the keys of the first and second devices. The exchanged keys may include a public key or a secret key. Also, the first and second devices may generate nonces, and exchange the generated nonces together with the keys of the first and second devices.

According to some embodiments, the generating of the encryption key may be performed before or after the exchanging of the keys between the first and second devices. The encryption key may be generated based on the exchanged keys or the exchanged nonces.

In operation 203, the first device may generate key identification information by using the generated encryption key, and generate encrypted data.

According to some embodiments, the key identification information enables the second device to identify the first device. In other words, since the second device may also generate the key identification information based on the keys and nonces exchanged with the first device, the second device may identify the first device. The second device may obtain the encryption key based on the key identification information. According to some embodiments, the first and second devices may not exchange the keys. In other words, the first device may generate the key identification information based on the encryption key, identification information of the first device, and identification information of the second device without having to exchange the keys.

Also, according to some embodiments, the first device may generate the key identification information based on information of an application used by the first and second devices. For example, the first device may generate the key identification information based on information of a predetermined messenger application used with the second device.

The second device may obtain the encryption key by using the key identification information and the identification information of the second device. For example, identification information of a device may include a phone number, a media access control (MAC) address, an internet protocol (IP) address, a manufacture number of the device, but is not limited thereto. According to some embodiments, operations of the first device generating the encrypted data by encrypting data by using the encryption key may be performed by using any one of various methods. For example, the first device may process the data such that the data is decrypted by only using a predetermined key, by mixing the data according to a predetermined style or rearranging (encrypting) the data disorderly, thereby protecting the data.

Also, according to some embodiments, the first data may scramble the data while transmitting the data such that the original data is reconstructed only by a person having a certain key.

Also, according to some embodiments, an order of the generating of the key identification information and the generating of the encrypted data may be changed according to an embodiment.

In operation 205, the first device may transmit a data set including the generated key identification information and the encrypted data to the second device. Also, when the data transmitted by the first device is an image, the key identification information may be inserted into the image data.

According to some embodiments, the first device may transmit the encryption key after encrypting the encryption key by using the key of the first device or the key of the second device. For example, the first device may encrypt the encryption key by using a shared key of the first device and provide the encryption key to the second device. The second device may identify the first device based on the key identification information, and decrypt the encryption key, which is encrypted by using the shared key of the first device, by using the shared key of the first device.

According to some embodiments, the first device may transmit the data set to a plurality of devices including the second device. The first device may encrypt the encryption key by using a key of each of the plurality of devices including the second device, and transmit the encryption key, together with the key identification information, to each of the plurality of devices including the second device.

Also, according to some embodiments, the first device may encrypt the encryption key by using the key of the second device, and provide the encryption key to the second device. The second device may decrypt the encrypted encryption key by using the key of the second device.

Figure 3:
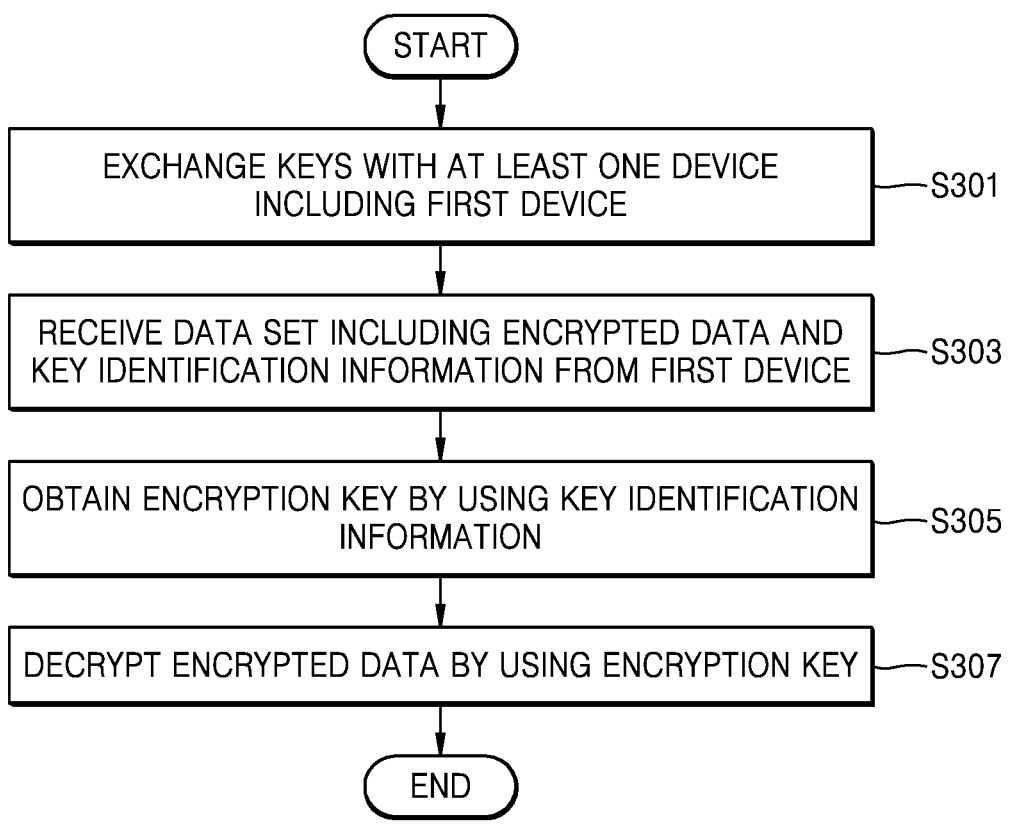
FIG. 3 is a flowchart of a method of receiving, by a second device, encrypted data for preventing identification of transmitting and receiving devices, from a first device, according to some embodiments.

FIG. 3 is a flowchart of a method of receiving, by a second device, encrypted data for preventing identification of transmitting and receiving devices, from a first device, according to some embodiments.

In operation 301, the second device may exchange keys with at least one device including the first device. According to some embodiments, a key of a device may include a public key or secret key of the device. Also, according to some embodiments, exchanging of keys may denote at least one of transmitting and receiving of each other's keys. For example, a key exchange may denote the first device transmitting the key of the first device to the second device and receiving the key of the second device from the second device. Also, a key exchange may denote the first device receiving the key of the second device from the second device, when the first device does not need to transmit the key of the first device.

Also, according to some embodiments, the second device may exchange predetermined values, such as nonces, with the first device.

In operation 303, the second device may receive a data set including encrypted data and key identification information from the first device. The second device may determine that the received data set is a data set transmitted and encrypted by the first device, based on the key identification information included in the data set. However, since another device (a third person) did not exchange keys or predetermined values with the first device, even if the other device obtains the key identification information included in the data set, the other device is unable to obtain information about a transmitting device of the data set.

According to some embodiments, the data set may further include a message authentication code (MAC). The message authentication code may be used by the second device that received data to determine whether the obtained encryption key is a correct encryption key.

In operation 305, the second device may obtain the encryption key by using the key identification information. For example, the second device may identify the first device that transmitted the data through the key identification information, and obtain the encryption key generated based on an agreement with the first device.

According to some embodiments, the second device may generate the encryption key based on the key of the first device and the key of the second device. Also, according to some embodiments, when the encryption key is encrypted by using the key of the second device, the second device may generate the encryption key by only using the key of the second device. Also, in order to generate the encryption key, predetermined values exchanged while the keys are exchanged may be required.

In operation 307, the second device may decrypt the encrypted data by using the encryption key. The first device has transmitted encrypted data that may be decrypted by using only a predetermined key, by mixing the data according to a predetermined style or rearranging (encrypting) the data disorderly, so as to protect the data, and the second device may decrypt the data by using the encryption key obtained in operation 305.

Figure 4:
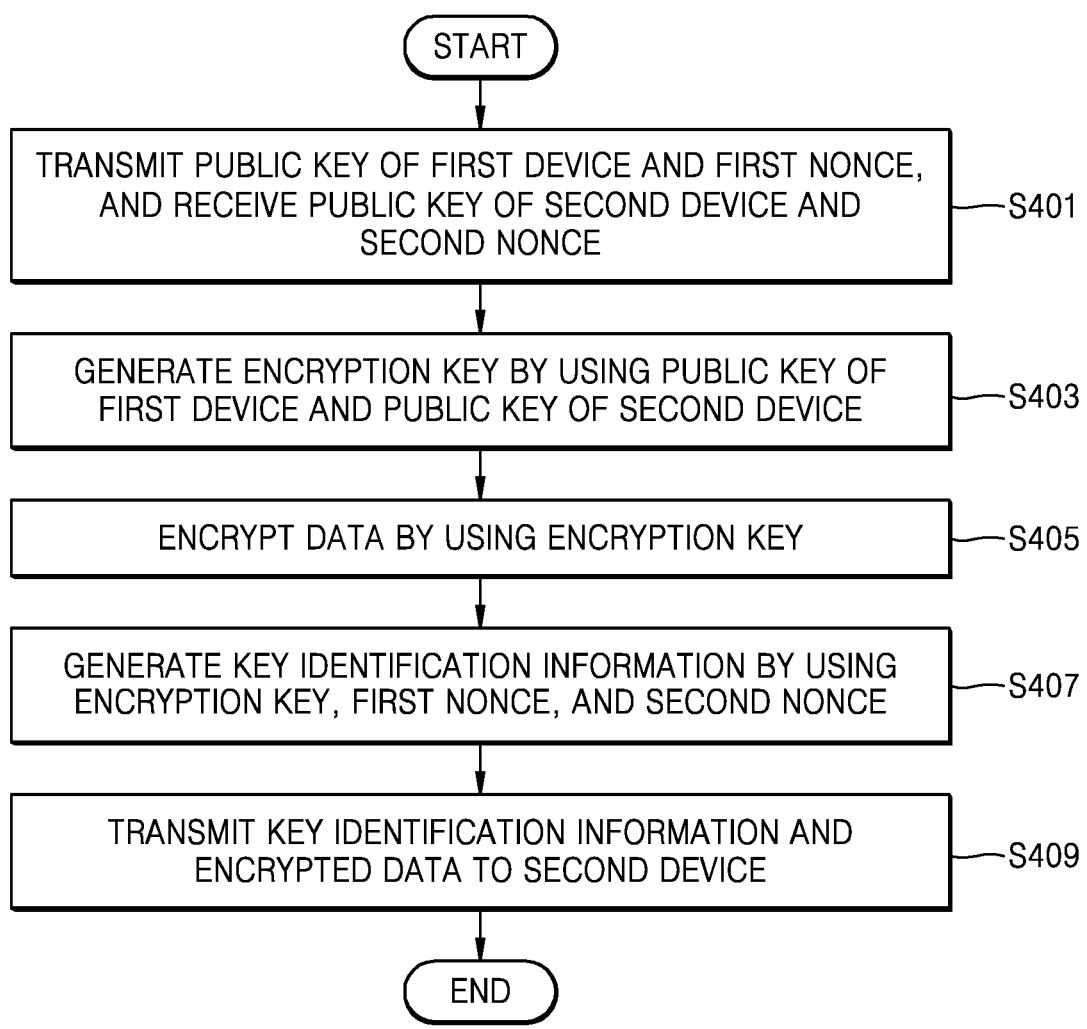
FIG. 4 is a flowchart of a method of transmitting encrypted data by using a public key and a nonce, according to some embodiments.

FIG. 4 is a flowchart of a method of transmitting encrypted data by using a public key and a nonce, according to some embodiments.

In operation 401, a first device transmits a public key of the first device and a first nonce to the second device, and receives a public key of the second device and a second nonce from the second device. The public keys of the first and second devices may be used to generate an encryption key, and the first and second nonces may be used to generate key identification information by using the encryption key.

In operation 403, the first device generates an encryption key $k_{ab}$ by using the public key of the first device and the public key of the second device. An encryption key according to some embodiments may be generated by using the public keys of the first and second devices via a D-H method, but is not limited thereto.

In operation 405, the first device encrypts data by using the generated encryption key.

In operation 407, the first device generates key identification information $k_{id}$ by using the encryption key $k_{ab}$, the first nonce, and the second nonce. The key identification information $k_{id}$ include be a value obtained by hashing a value in which the first and second nonces are combined by using the encryption key. For example, the key identification information may be expressed by $k_{id}$=|nonce_a||nonce_b|$k_{ab}$, but is not limited thereto.

In operation 409, the first device transmits the key identification information and the encrypted data to the second device.

Figure 5:
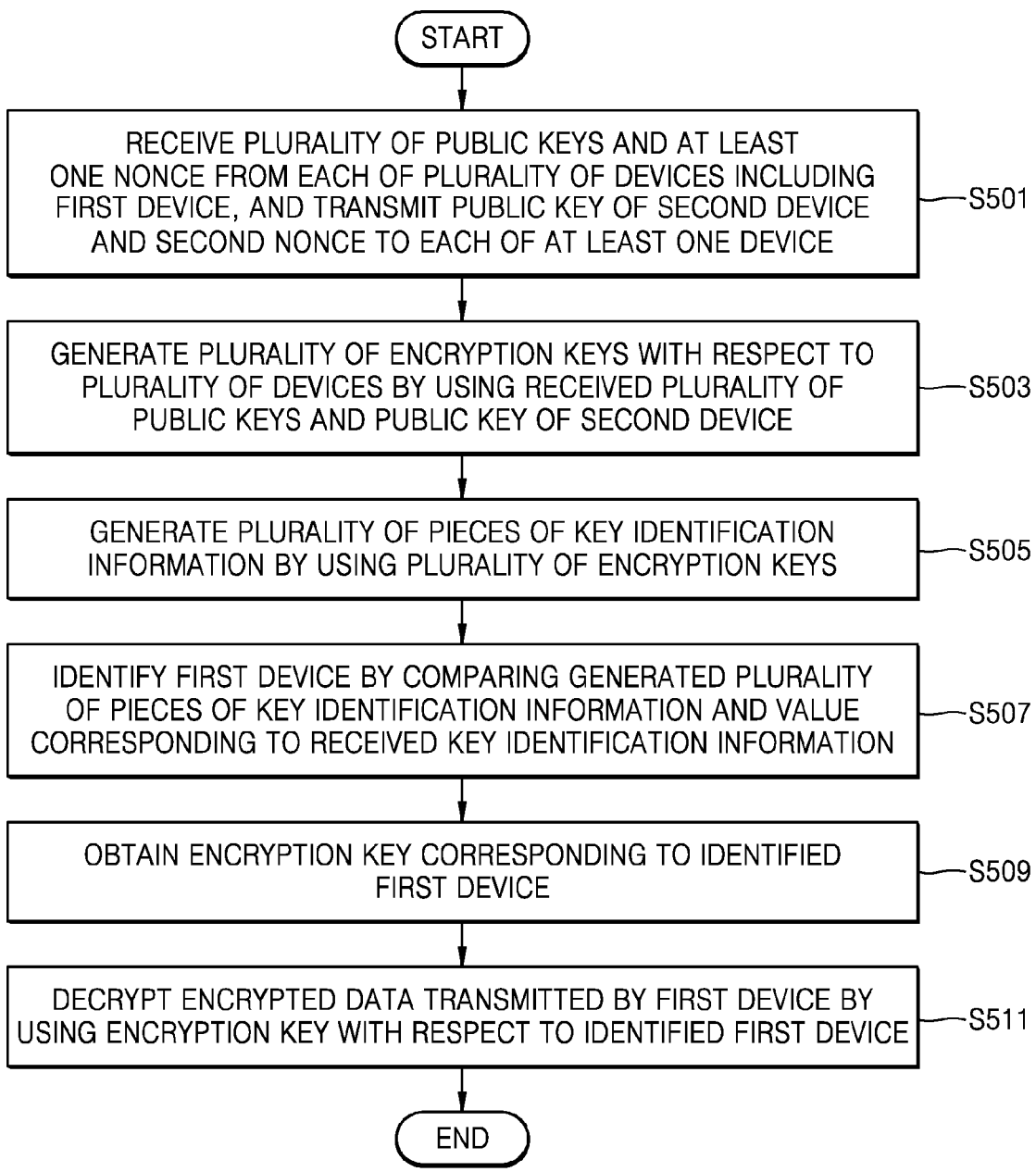
FIG. 5 is a flowchart of a method of receiving encrypted data by using a public key and a nonce, according to some embodiments.

FIG. 5 is a flowchart of a method of receiving encrypted data by using a public key and a nonce, according to some embodiments.

In operation 501, a second device and a plurality of external devices including a first device exchange public keys and nonces. Also, when only the first device is expected to transmit encrypted data, the second device may exchange the public keys and the nonces only with the first device.

In operation 503, the second device generates a plurality of encryption keys with respect to the plurality of devices, by using the received plurality of public keys. For example, the plurality of encryption keys may include an encryption key using the public key of the first device. The encryption key using the public key of the first device may be used to decrypt encrypted data received from the first device.

In operation 505, a plurality of pieces of key identification information is generated by using the generated plurality of encryption keys.

In operation 507, the second device identifies a key of the first device that transmitted data by comparing the generated plurality of pieces of key identification information and received key identification information.

According to some embodiments, the identifying of the key may include an operation of the second device selecting the public key of the first device from among the plurality of public keys exchanged with the plurality of devices including the first device in operation 501, based on the key identification information, or selecting an encryption key using the public key of the first device.

In operation 509, the second device may obtain an encryption key corresponding to the identified first device. In other words, the second device may identify the key of the first device in operation 507, and select or obtain the encryption key corresponding to the first device based on a result of the identification.

In operation 511, the second device decrypts encrypted data transmitted by the first device, by using the encryption key with respect to the identified first device.

Figure 6:
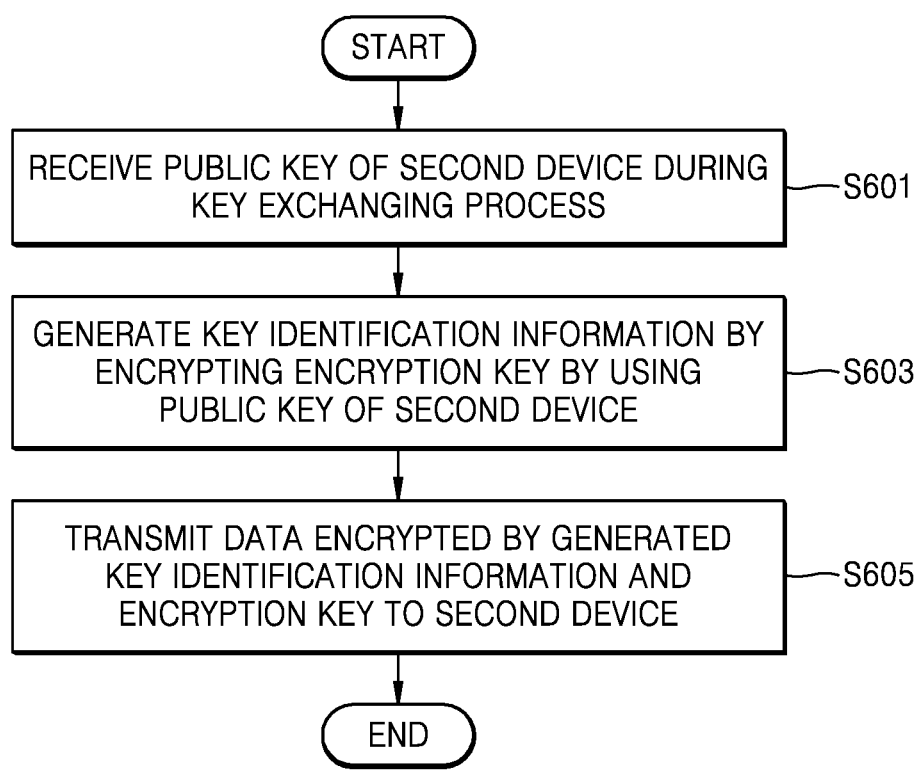
FIG. 6 is a flowchart of a method of transmitting encrypted data by using a public key of a receiving device, according to some embodiments.

FIG. 6 is a flowchart of a method of transmitting, by a first device, an encryption key by using a public key of a second device, according to some embodiments.

In operation 601, the first device receives the public key of the second device. Here, the first device may also transmit a public key of the first device to the second device. In operation 603, the first device generates an encryption key for encrypting data. The encryption key may be randomly generated. Also, the encryption key may be generated based on at least one of the public keys of the first and second devices.

In operation 603, the first device generates key identification information $k_{id}$ by encrypting an encryption key g by using a public key Pr2 of the second device. According to some embodiments, the key identification information may be information generated by encrypting the encryption key. For example, the key encryption information may be expressed by $k_{id}$=E_Pr2(g). Also, according to some embodiments, the key identification information may be a result value of a keyed hash function, in which an input is the encryption key and a hash function key is the public key of the second device. For example, $k_{id}=f_{pr2}(g)$.

In operation 605, the first device transmits data encrypted by the generated key identification information and the encryption key to the second device.

Figure 7:
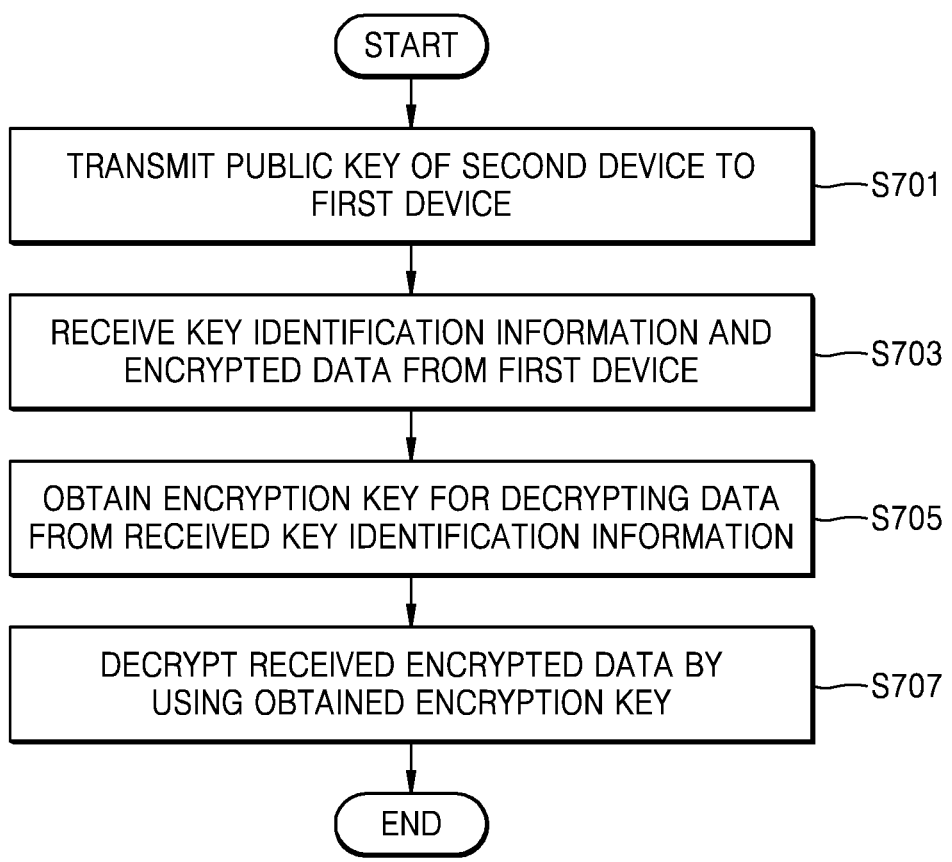
FIG. 7 is a flowchart of a method of receiving encrypted data by using a reception public key, according to some embodiments.

FIG. 7 is a flowchart of a method of receiving, by a second device, encrypted data by using a public key of the second device, according to some embodiments.

In operation 701, the second device exchanges keys with a first device. For example, the second device may transmit the public key of the second device to the first device.

In operation 703, the second device receives key identification information and encrypted data from the first device.

In operation 705, the second device obtains an encryption key for decrypting data from the received key identification information. The key identification information may be data obtained when the first device encrypts the encryption key by using the public key of the second device. The second device may obtain the encryption key by decrying the key identification information by using a private key of the second device, which corresponds to the public key of the second device.

In operation 707, the second device decrypts the received encrypted data by using the encryption key obtained in operation 705.

Figure 8:
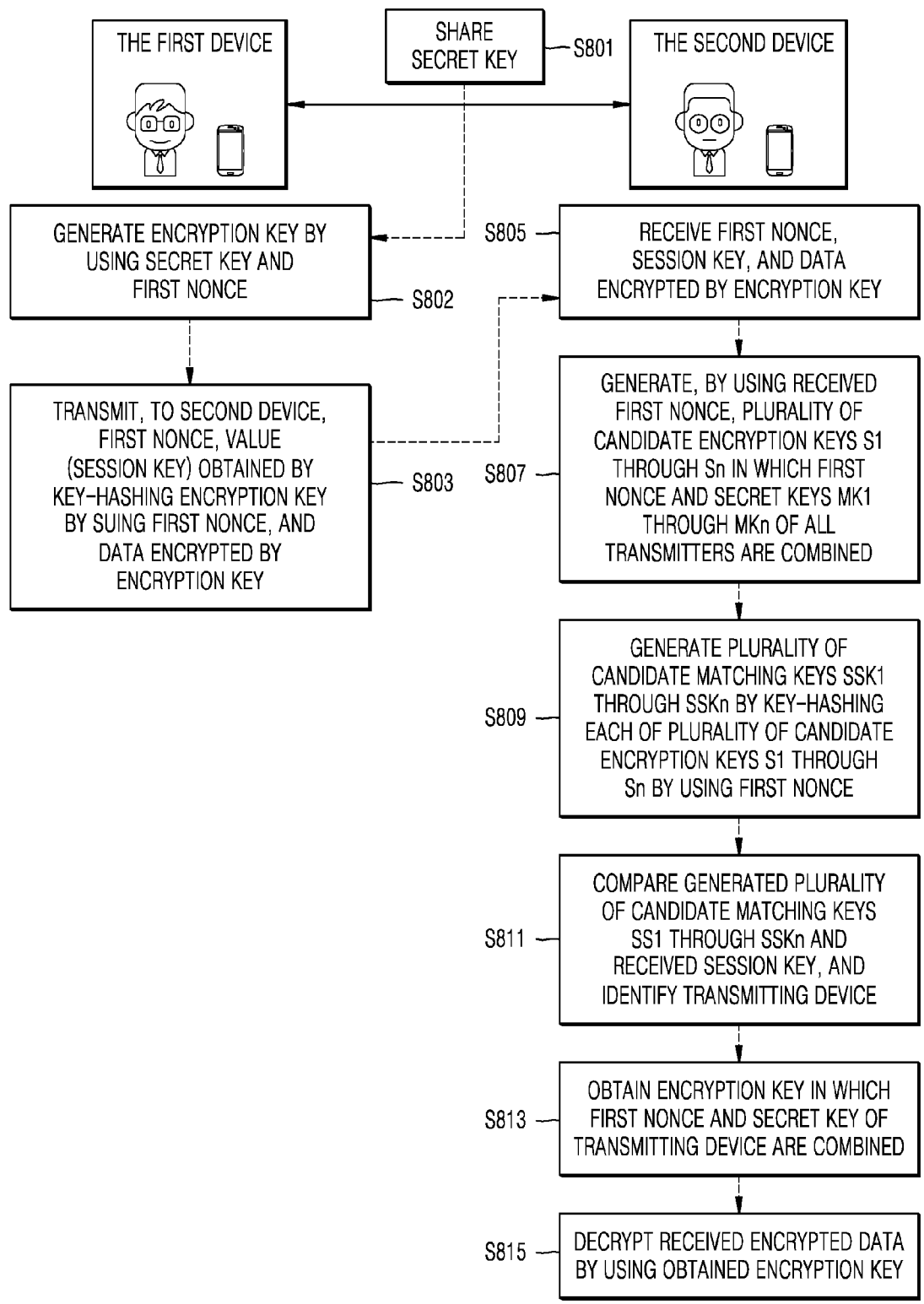
FIG. 8 is a flowchart of a method of transmitting and receiving encrypted data for preventing identification of transmitting and receiving devices by using a shared secret key, according to some embodiments.

FIG. 8 is a flowchart of a method of transmitting and receiving encrypted data for preventing identification of transmitting and receiving devices by using a shared secret key, according to some embodiments.

In operation 801, a first device and a second device share the same secret key. The secret key is a symmetric key, is data shared only between the first and second devices, and may be data not exposed to a device other than the first and second devices.

According to some embodiments, the sharing of the secret key may include not only a procedure of transmitting the secret key to each other, but also a procedure of determining, selecting, or generating the secret key via certain procedures.

In operation 802, the first device generates an encryption key S by using the secret key and a first nonce. According to some embodiments, the secret key may include a master key Masterkey. According to some embodiments, the encryption key may be generated by the master key and a predetermined value, such as nonce, but is not limited thereto (encryption key S=master key Masterkey+predetermined value nonceA).

In operation 803, the first device transmits, together with a first nonce and encrypted data, a value (session key) obtained by key-hashing the encryption key by using the first nonce, to the second device. In other words, data transmitted by the first device may include: the first nonce; the session key; and the encrypted data.

Also, according to some embodiments, the first device may encrypt data by using the generated encryption key.

In operation 805, the second device receives the first nonce, the session key, and the encrypted data. The session key may include the MAC described above.

In operation 807, the second device generates, by using the received first nonce, a plurality of candidate encryption keys S1 through Sn in which the first nonce and secret keys MK1 through MKn of all transmitting devices including the previously shared first device are combined.

In operation 809, the second device generates a plurality of candidate matching keys SS1 through SSn by key-hashing each of the generated plurality of candidate encryption keys S1 through Sn by using the first nonce. The plurality of candidate matching keys are formulas and may be expressed as $f_{nonceA}(S1)$ through $f_{nonceA}(Sn)$. According to some embodiments, a nonce is a predetermined value, and may include a nonce generated by the first or second device.

In operation 811, the second device may identify the session key of the first device that transmitted the session key by comparing the received session key and the generated plurality of candidate matching keys SS1 through SSn. Also, according to some embodiments, the second device may identify the secret key shared with the first device.

In operation 813, the second device may obtain the encryption key in which the first nonce and the secret key shared with the first device that transmitted the data are combined. Also, according to some embodiments, since the encryption key corresponding to the first device is one of n encryption keys generated in operation 809 by the second device, the second device may select one of the candidate encryption keys S1 through Sn generated by the second device based on the session key. In operation 815, the second device decrypts the encrypted data by using the obtained encryption key.

Figure 9:
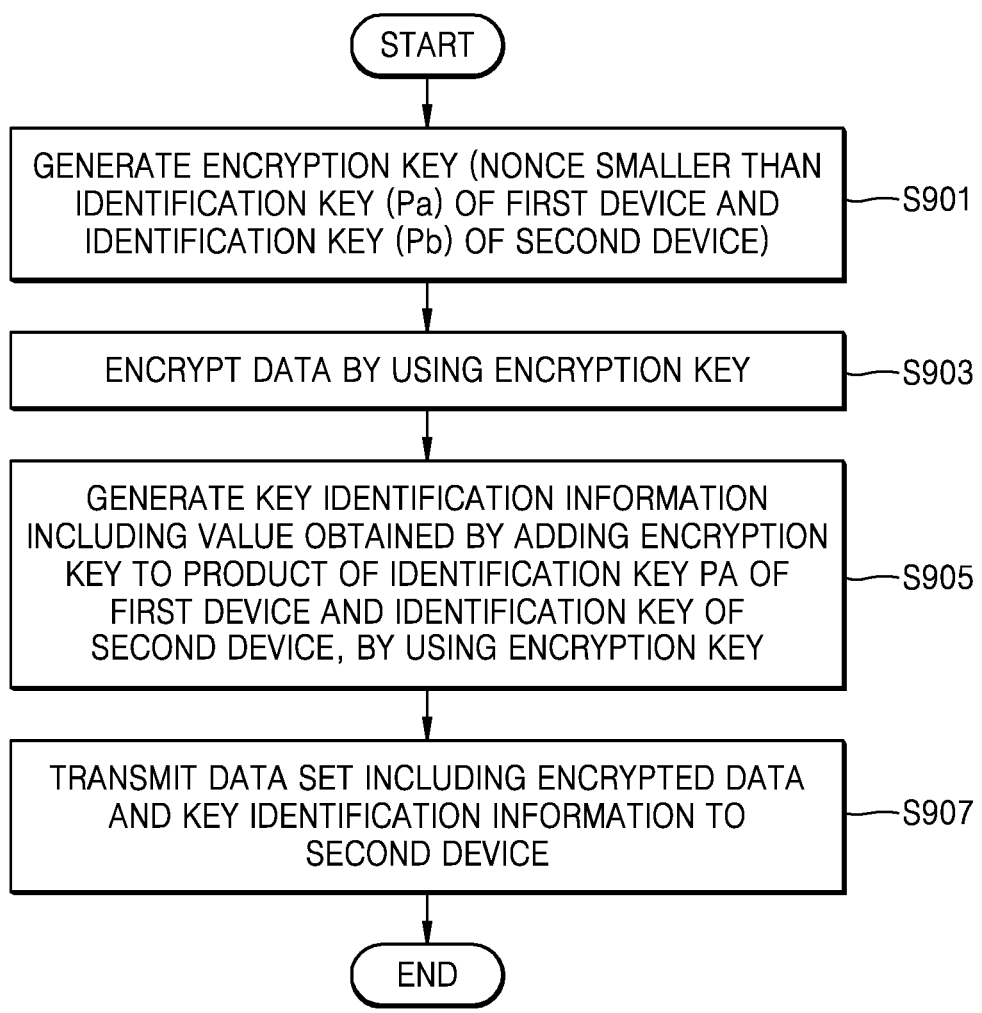
FIG. 9 is a flowchart of a method of transmitting encrypted data for preventing identification of transmitting and receiving devices by using an integer capable of identifying a device, according to some embodiments.

FIG. 9 is a flowchart of a method of transmitting encrypted data for preventing identification of transmitting and receiving devices by using an identification number of a device, according to some embodiments.

In operation 901, a first device generates an encryption key. According to some embodiments, the encryption key may include a nonce smaller than an identification number Pa of the first device and an identification number Pb of a second device.

According to some embodiments, an identification number may include a phone number or an ID, and when the identification number or the encryption key is not an integer, it may be converted to an integer through a predetermined table to be used for the method of FIG. 9. Also, according to some embodiments, an identification number may be an identification key. In operation 903, the first device encrypts data by using the encryption key.

In operation 905, the first device generates key identification information $K_{id}$ including a value obtained by adding the encryption key R to a product or greatest common divisor of the identification number Pa of the first device and the identification number Pb of the second device, by using the encryption key. For example, the key identification information may be generated according to an equation $k_{id}$=pa*pb+r, but is not limited thereto.

In operation 907, the first device transmits a data set including the encrypted data and the key identification information to the second device. Operations of the second device that received the data set will be described in detail with reference to FIG. 10.

Figure 10:
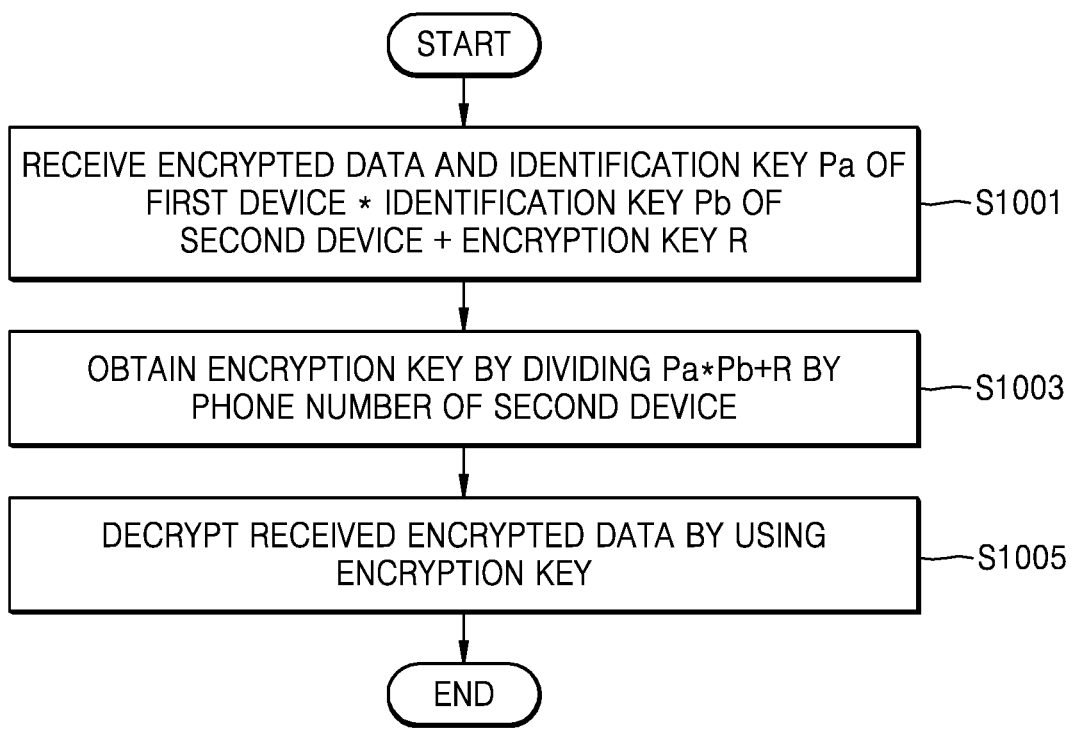
FIG. 10 is a flowchart of a method of receiving encrypted data for preventing identification of transmitting and receiving devices by using an integer capable of identifying a device, according to some embodiments.

FIG. 10 is a flowchart of a method of receiving encrypted data for preventing identification of transmitting and receiving devices by using an integer capable of identifying a device, according to some embodiments.

In operation 1001, a second device receives key identification information (Pa*Pb+R) and encrypted data.

In operation 1003, the second device obtains R obtained after dividing the key identification information (Pa*Pb+R) by an identification number of the second device. Here, R may be an encryption key obtained when a first device encrypts data.

In operation 1005, the second device decrypts the received encrypted data by using the encryption key R.

Figure 11:
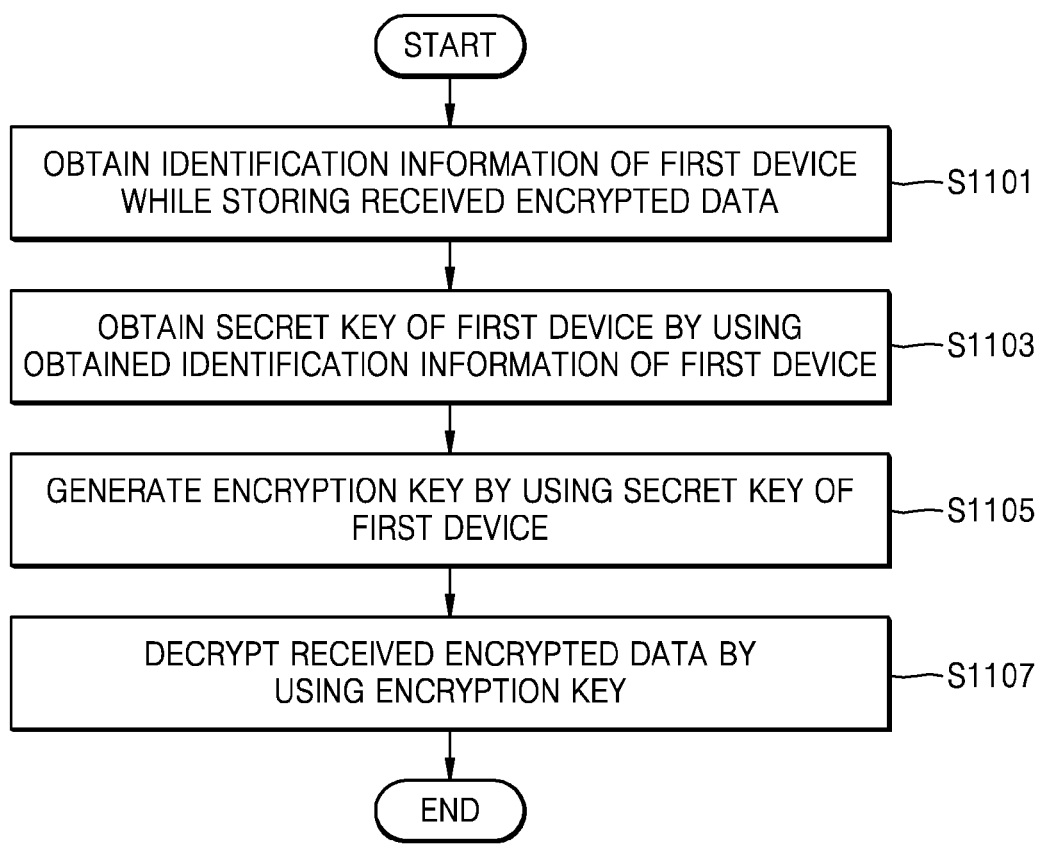
FIG. 11 is a flowchart of a method of receiving encrypted data, wherein the encrypted data is stored while identification information of a first device is obtained, according to some embodiments.

FIG. 11 is a flowchart of a method of receiving encrypted data, wherein the encrypted data is stored while identification information of a first device is obtained, according to some embodiments.

In operation 1101, a second device obtains the identification information of the first device while the received encrypted data is stored. A process of obtaining identification information may include, for example, operations of selecting, by a receiving device, a transmitting device from among devices in a predetermined list, and adding and storing identification information of the selected transmitting device in encrypted data.

According to some embodiments, a method of obtaining, by the second device, the identification information of the first device, may be generated via various parameters (for example, a nonce, a secret key, etc.) as described above with reference to FIGS. 1 through 10.

Also, according to an embodiment, the second device may generate the identification information for identifying the first device that transmitted the data while storing the received data.

According to some embodiments, the second device may share a secret key with a plurality of devices including the first device.

In operation 1103, the second device obtains a secret key of the first device by using the obtained identification information of the first device. In other words, the second device may obtain the secret key of the first device that is a transmitting device, based on the identification information generated in operation 1101.

In operation 1105, the second device generates an encryption key by using the secret key of the first device. According to some embodiments, the secret key of the first device may be the same as the encryption key used when the first device encrypts the data.

In operation 1107, the second device decrypts the encrypted data by using the encryption key.

According to some embodiments, the second device may generate a decryption key corresponding to the encryption key by using the encryption key, may decrypt the encrypted data by using the generated decryption key, and perform decryption by using the encryption key.

Figure 12:
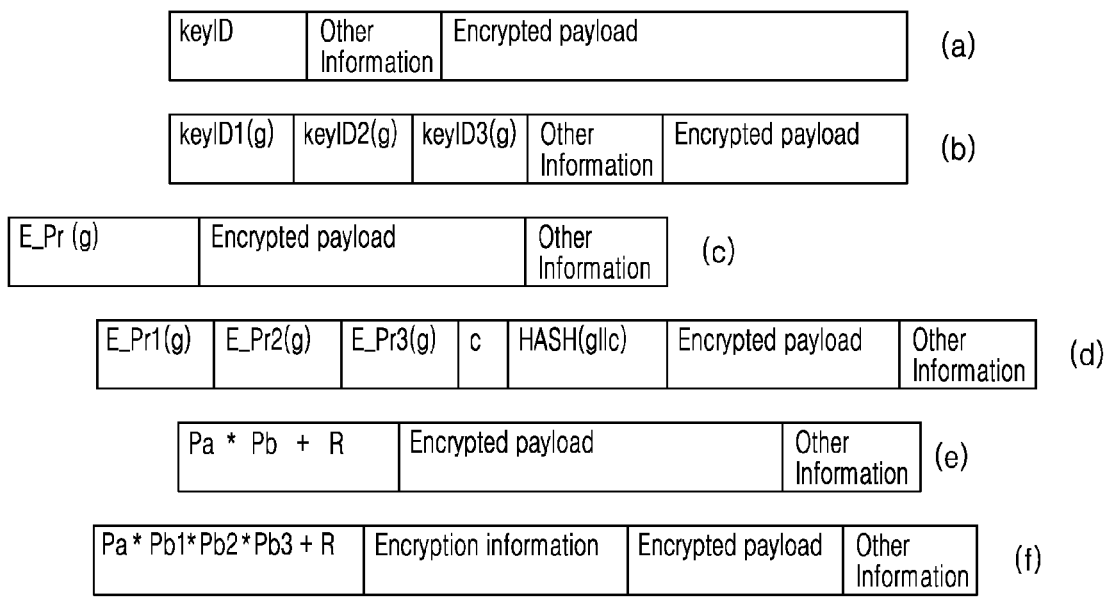
FIG. 12 is a conceptual diagram of a method of transmitting, by a transmitting device, encrypted data with respect to a group of predetermined devices, according to some embodiments.

FIG. 12 is a conceptual diagram of a method of transmitting, by a transmitting device, encrypted data with respect to a group of predetermined devices, according to some embodiments.

FIG. 12 (*a*) illustrates a data set generated by the transmitting device when there is one receiving device. The data set of FIG. 12 (*a*) may include an encryption key generated by using a public key, and key identification information.

FIG. 12 (*b*) illustrates a data set generated by the transmitting device when a receiving device is a group including a plurality of devices. The data set of FIG. 12 (*b*) illustrates a structure of a data set including a plurality of pieces of key identification information, unlike FIG. 12 (*a*). Since key identification information is generated for each of the receiving devices, the data set of FIG. 12 9*b*) may include the number of pieces of key identification information equal to the number of receiving devices.

FIG. 12 (*c*) illustrates a structure of a data set including data and a public key, which are encrypted by the transmitting device by using a public key of a device receiving an encryption key g, when there is one receiving device. The data set of FIG. 12 (*c*) may include an encryption key encrypted by using the public key of the receiving device instead of key identification information.

FIG. 12 (*d*) illustrates a data set transmitted by the transmitting device when a receiving device is a group including a plurality of devices. Unlike FIG. 12 (*c*), the data set of FIG. 12 (*d*) may include a plurality of encryption keys, which are encrypted by public keys of the plurality of devices. For example, E_Pr1(g) denotes that an encryption key g is encrypted by using a public key of a first receiving device, and E_Pr2(g) denotes that an encryption key g is encrypted by using a public key of a second receiving device. c may denote a nonce. However, an embodiment is not limited thereto.

According to some embodiments, the data set may include an MAC. The MAC may be used to determine whether the encryption key obtained by the receiving device is a correct encryption key. For example, hash(g∥c) in FIG. 12 (*d*) may be a value for determining whether which one of several pieces of key identification information for a group is key identification information for a device that received the data set.

For example, when the receiving device that received the data set decrypts E_Pr1(g) by using a private key of the receiving device, a value of g may be obtained. The receiving device may hash a value of c in the data set and the obtained value of g, and determine whether the hashed value is the same as hash(g∥c) in the received data set. Based on a result of the determination, the receiving device may determine whether E_Pr1(g) is key identification information for the receiving device. If they are not the same, the receiving device may repeat the same operations on E_Pr2 (g), E_Pr3(g), or the like to identify key identification information for the receiving device.

FIG. 12 (*e*) illustrates a structure of a data set of a method of transmitting encrypted data by using an identification number when there is one receiving device. As described above, the identification number may include data including predetermined integers, such as a phone number.

According to some embodiments, Pa in FIG. 12 (*e*) may be a phone number of a first device, Pb may be a phone number of a second device, and R may be a random integer smaller than the phone number Pa of the first device and the phone number Pb of the second device. Also, even when R is not an integer but a character or a decimal fraction, R may be changed to an integer according to a table to be applied to the above method.

FIG. 12 (*f*) illustrates a structure of a data set of a method of transmitting encrypted data by using an identification number, such as a phone number, when a receiving device is a group including a plurality of devices. Unlike FIG. 12 (*e*), the data set of FIG. 12 (*f*) may include key identification information generated by Pa (phone number of transmitting device)*Pb1 (phone number of first recipient)*Pb2 (phone number of second recipient)*Pb3 (phone number of third recipient)+R (encryption key).

According to some embodiments, from among the plurality of devices, the receiving device that received the data set of FIG. 12 (*f*) may obtain R (encryption key) that is a remainder obtained when the key identification information is divided by the phone number of the receiving device, regardless of a phone number of another device.

Also, the receiving device that received the data set of FIG. 12 (f) from among the plurality of devices may determine whether the obtained encryption key is a correct encryption key by using MAC. For example, the data set may include a nonce, key identification information, and the MAC, and the receiving device may obtain the encryption key R by using the key identification information and determine whether a value obtained by key-hashing the nonce by using the encryption key R is the same as the MAC, thereby determining whether the obtained encryption key is a correct encryption key.

According to some embodiments, the MAC may be included in other information included in the data set.

Figure 13:
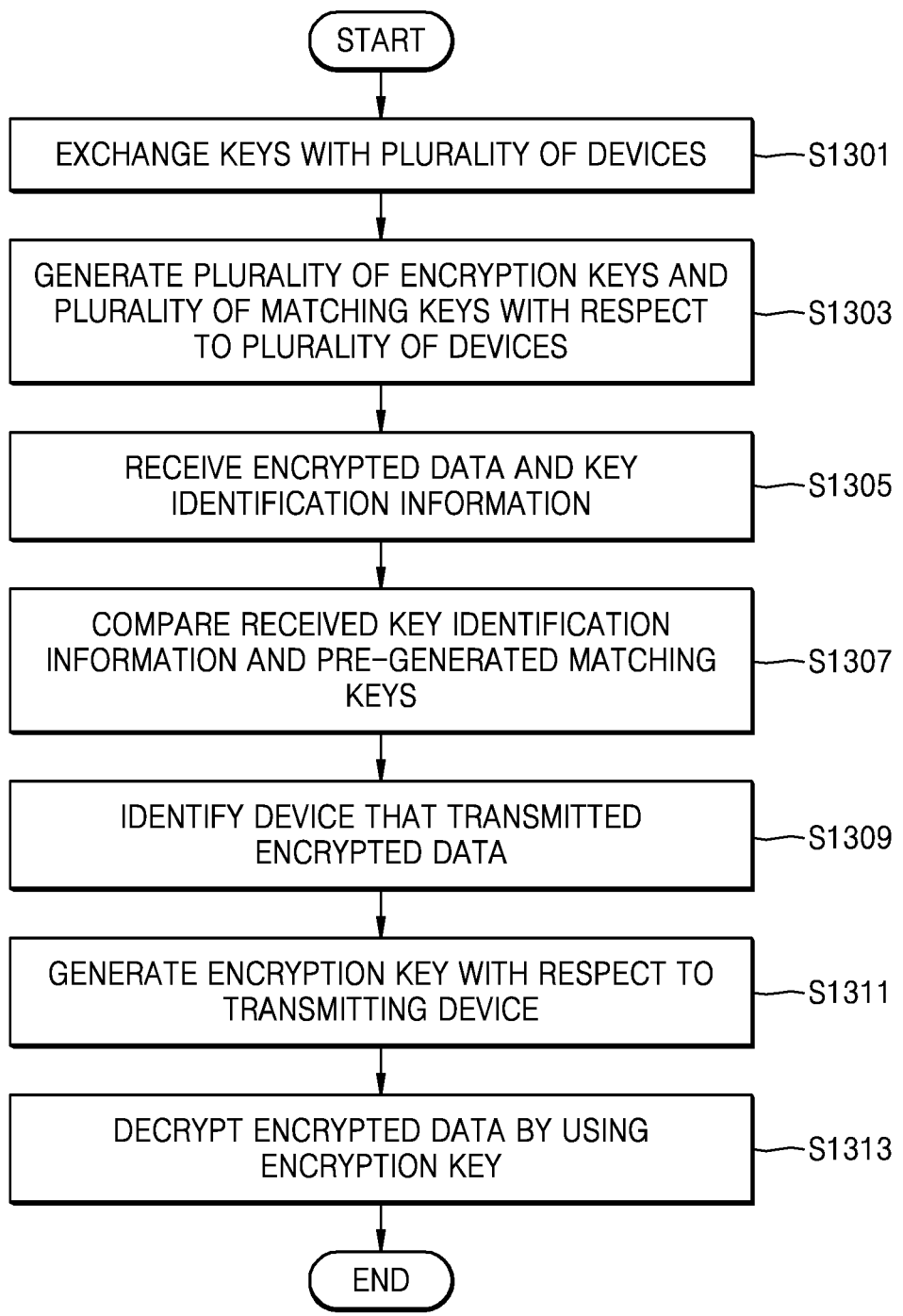
FIG. 13 is a flowchart for describing matching processes for receiving, by a second device, key identification information from a plurality of devices including a first device and identifying a key of the first device that transmitted data, according to some embodiments.

FIG. 13 is a flowchart for describing matching processes for receiving, by a second device, key identification information from a plurality of devices including a first device and identifying a key of the first device that transmitted data, according to some embodiments.

According to some embodiments, the matching processes may denote processes of searching for a matching value by comparing a value received by the second device and a plurality of values stored in the second device (or a server).

In operation 1301, the second device exchanges keys with the plurality of devices including the first device. According to some embodiments, a key in FIG. 13 may include a public key or a secret key, but is not limited thereto.

In operation 1303, the second device generates an encryption key by using each of the keys exchanged with the plurality of devices, and generates a plurality of matching keys with respect to the plurality of devices. According to some embodiments, the matching key may also be key identification information for identifying a key. Also, the second device may store at least one of the keys exchanged with the plurality of devices, the encryption keys, and the matching keys.

In operation 1305, the second device receives encrypted data and key identification information. According to some embodiments, the second device may receive a data set including the encrypted data and the key identification information.

In operation 1307, the second device compares the received key identification information and the pre-generated plurality of matching keys. According to some embodiments, the second device may store the stored matching keys and the received key identification information.

In operation 1309, the second device identifies a device that transmitted the encrypted data. In other words, the second device may identify the transmitting device based on a result of the comparing in operation 1307.

In operation 1311, the second device derives an encryption key of the device that transmitted the data.

In operation 1313, the second device may encrypt the encrypted data by using the encryption key.

Figure 14:
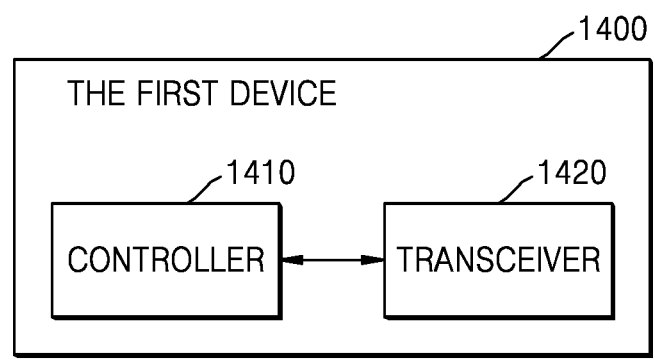
FIG. 14 is a block diagram of a first device transmitting encrypted data for preventing identification of transmitting and receiving devices to a second device, according to some embodiments.

FIG. 14 is a block diagram of a first device transmitting encrypted data for preventing identification of transmitting and receiving devices to a second device, according to some embodiments.

According to some embodiments, a first device 1400 includes a controller 1410 and a transceiver 1420.

According to some embodiments, the controller 1410 generates an encryption key, generates key identification information by using the generated encryption key, and encrypts data.

According to some embodiments, the transceiver 1420 transmits a data set including encrypted data and the key identification to the second device. Here, the key identification information may include information of a transmitting device, which is identifiable only by a receiving device, in an encrypted form. The controller 1410 may generate the key identification information by using not only the encryption key, but also at least one of a public key of the second device, an identification number, and a secret key of the second device. Since a method of generating key identification information has been described above with reference to FIGS. 1 through 13, details thereof are not provided again.

Figure 15:
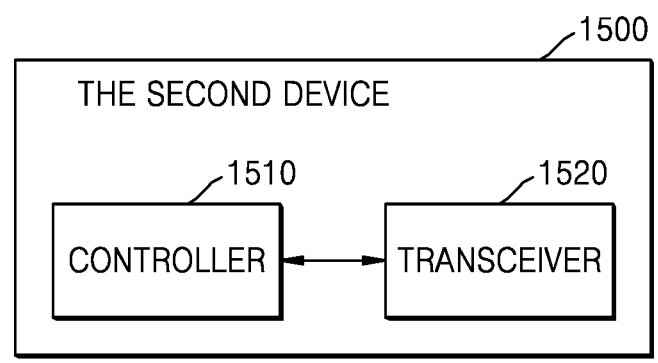
FIG. 15 is a block diagram of a device receiving an encrypted data set that prevents identification of transmitting and receiving devices, according to some embodiments.

FIG. 15 is a block diagram of a second device receiving an encrypted data set that prevents identification of transmitting and receiving devices, according to some embodiments.

According to some embodiments, a second device 1500 includes a controller 1510 and a transceiver 1520.

According to some embodiments, the transceiver 1520 receives a data set including encrypted data and key identification information, from a first device. The key identification information may include information of a transmitting device, which is identifiable only by a receiving device, in an encrypted form.

According to some embodiments, the controller 1510 may obtain an encryption key by using the key identification information, and decrypt the encrypted data by using the encryption key. For example, the controller 1510 may identify a transmitting device based on the key identification information included in the data set received by the transceiver 1520, and obtain or select the encryption key based on a result of the identification. The controller 1510 may decrypt the encrypted data by using the encryption key. Operations of the controller 1510 obtaining the encryption key correspond to descriptions of FIGS. 1 through 10.

Figure 16:
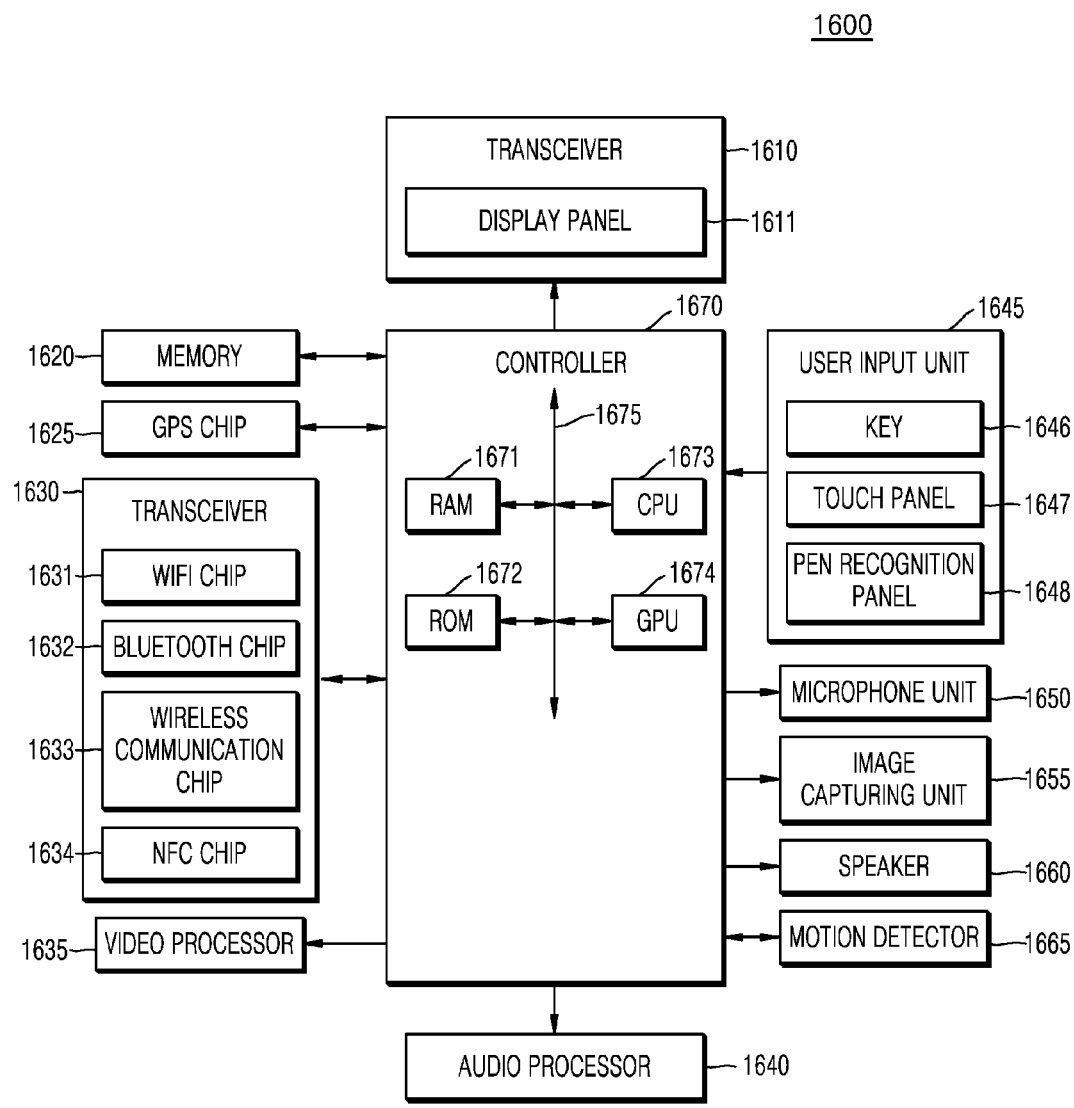
FIG. 16 is a detailed block diagram for describing a device according to some embodiments.

FIG. 16 is a detailed block diagram for describing a device according to some embodiments.

According to an embodiment, a second device may include a transceiver configured to share at least one secret key with at least one device including a first device, and a controller configured to receive encrypted data from a first device, identify the first device that transmitted the encrypted data while receiving the encrypted data, add or store identification information of the identified first device to or in the encrypted data, identify a secret key shared with the first device by using the identification information of the first device, generate an encryption key by using the secret key, and decrypt the encrypted data by using the encryption key.

Also, according to an embodiment, a receiving device may generate, while receiving data, identification information for identifying a transmitting device according to a predetermined method for identifying the transmitting device, and obtain an encryption key with respect to encrypted data by using the identification information of the transmitting device. Key identification information may be generated based on at least one of a nonce exchanged with the second device, a public key, a secret key, an identification number, and an application being used, and since a method of generating, by a controller 1670, key identification information corresponds to that described above, details thereof are not provided again.

According to some embodiments, the controller may include at least one of a random access memory (RAM) 1671, a central processing unit (CPU) 1673, a read-only memory 1672, a graphical processing unit (GPU) 1674, and a bus 1675, wherein the RAM 1671 or the ROM 1672 included in the controller may be a same or different storage unit as or from a memory 1620.

According to an embodiment, the first device may be a mobile device, such as a cellular phone, a smart phone, a PMP, a tablet computer, a MP3 player, or a navigation device, or a home device, such as a personal computer (PC), a laptop computer, a TV, a monitor, or a refrigerator, but is not limited thereto.

According to an embodiment, a user input unit 1645 receives an input from a user, and may include, for example, a keyboard, a touchpad, a touch screen, a mouse, a track ball, or an electric pen, but is not limited thereto. According to some embodiments, the user input unit 1645 may include at least one of a key 1646, a touch panel 1647, and a pen recognition panel 1648.

According to an embodiment, a motion detector 1665 may include various sensors, such as a global positioning system (GSP) sensor, an acceleration sensor, a proximity sensor, a pressure sensor, and an illumination sensor. In addition, the motion detector 1665 may detect a state of the first device and an event generated in the first device, based on information received from an external device, such as a server.

According to an embodiment, a transceiver 1630 may include a WiFi chip 1631, a Bluetooth chip 1632, a wireless communication chip 1633, and a near field communication (NFC) chip 1634. The transceiver 1630 may be a component that performs communication with another device according to control of the controller 1670.

According to an embodiment, the memory 1620 may include any type of memory performing an operation as a main memory device or auxiliary memory device embedded in a device, such as RAM, a flash memory, a hard disk, or a solid state disk (SSD).

Also, according to some embodiment, a first device 1600 may include a GPS chip 1625, an audio processor 1640, a video processor 1635, a microphone unit 1650, an image capturing unit 1655, a speaker 1660, and a display unit 1610 including a display panel 1611.

Also, the first device 1600 may be the same device as the first device 1400 of FIG. 14. Also, components shown in FIG. 16 are not all essential components of the first device 1600. The first device 1600 may include more or less components than those shown in FIG. 16. Also, according to some embodiments, the second device 1500 described above may also include the same components as the first device 1600.

A device according to the present disclosure may include a processor, a memory storing and executing a program data, a permanent storage unit, such as a disk drive, a communication port communicating with an external device, and a user interface (UI) device, such as a touch panel, a key, or a button. When software modules are involved, these software modules may be stored as program instructions or computer-readable codes executable on the processor on a computer-readable media such as ROM, RAM, CD-ROMs, magnetic tapes, floppy disks, and optical data storage devices. The computer-readable recording medium can also be distributed over network coupled computer systems so that the computer-readable code is stored and executed in a distributed fashion. This media can be read by the computer, stored in the memory, and executed by the processor.

Figure 17:
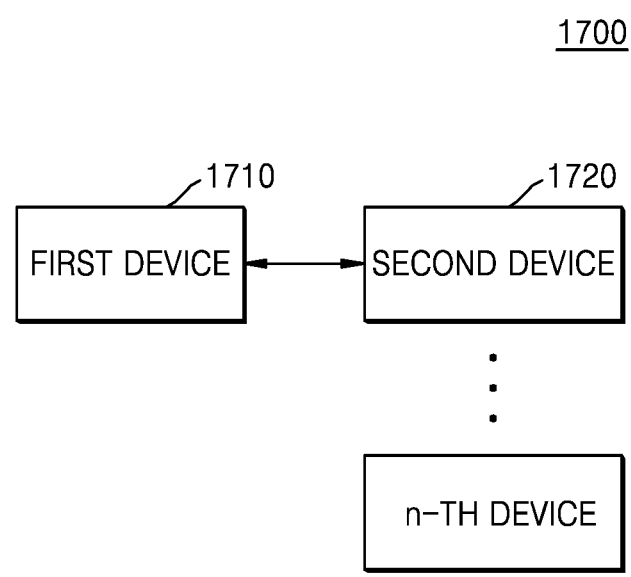
FIG. 17 is a conceptual diagram of a system transmitting and receiving encrypted data for preventing identification of transmitting and receiving devices, according to some embodiments.

FIG. 17 is a conceptual diagram of a system transmitting and receiving encrypted data for preventing identification of transmitting and receiving devices, according to some embodiments.

The system according to some embodiments may include a first device 1710 transmitting encrypted data and a second device 1720 receiving encrypted data.

The first device 1710 may generate an encryption key, encrypt data by using the generated encryption key, and transmit a data set including the encrypted data and key identification information to the second device 1720.

Also, the second device 1720 may receive the data set, obtain the encryption key by using the key identification information of the received data set, and decrypt the encrypted data by using the obtained encryption key.

Also, according to some embodiments, the first device 1710 may transmit the data set to a group of a plurality of devices (the second device through n-th device) including the second device 1720. Since descriptions thereof are the same as those above, details thereof are not provided again.

Figure 18:
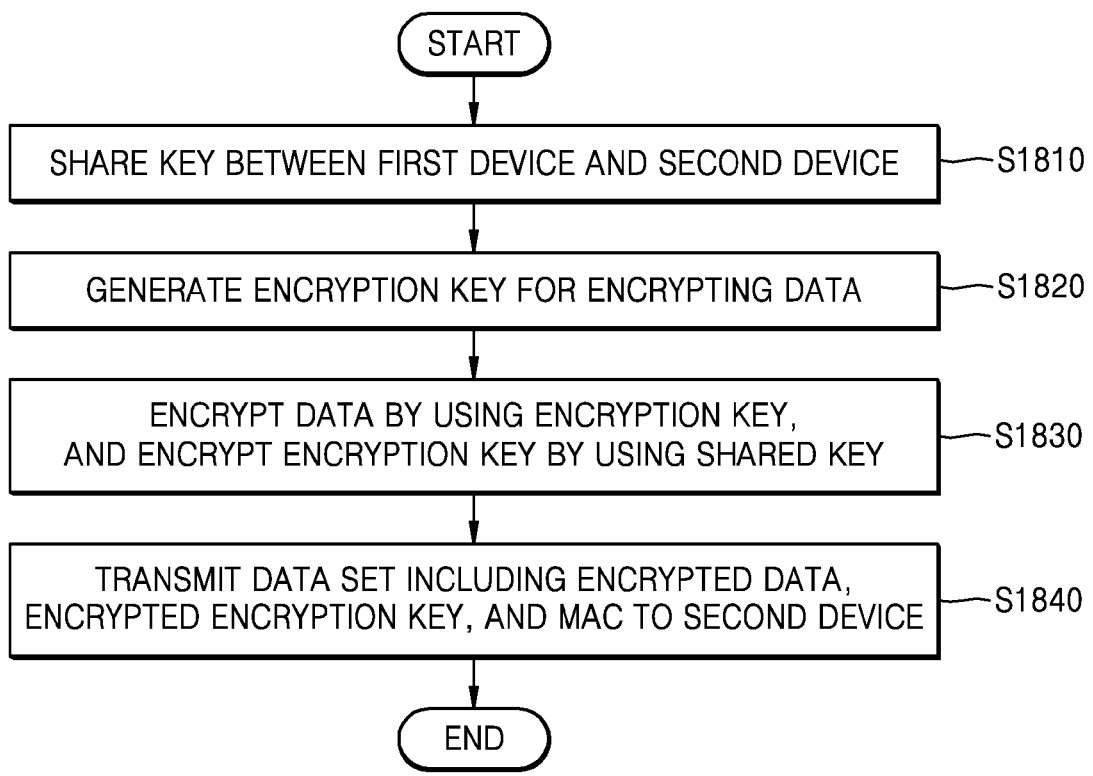
FIG. 18 is a flowchart of a method of transmitting encrypted data for preventing identification of transmitting and receiving devices, according to some embodiments.

FIG. 18 is a flowchart of a method of transmitting encrypted data for preventing identification of transmitting and receiving devices, according to some embodiments.

In operation 1810, a first device shares a key with a second device. According to some embodiments, the shared key may include a public key or a secret key. Also, according to some embodiments, the second device may exchange shared keys and nonces with the first device, and since descriptions thereof correspond to those of above, details thereof are not provided again.

In operation 1820, the first device generates an encryption key for encrypting data. The encryption key may be generated based on the key shared in operation 1810, or may be generated irrelevantly to the shared key. Also, according to some embodiments, the encryption key may be generated while the first and second devices exchange keys.

Also, according to some embodiments, the encryption key may not be generated by the first device. For example, the encryption key generated by the second device may be transmitted to the first device during the sharing process.

In operation 1830, the first device encrypts the data by using the generated encryption key, and encrypts the encryption key by using the key shared with the second device. For example, when the key shared with the second device is a public key, the encryption key may be encrypted by using the public key of the second device. Here, the second device may decrypt the encrypted encryption key by using a secret key of the second device.

In operation 1840, the first device transmits a data set including the encrypted data, the encrypted encryption key, and MAC, to the second device. The MAC may be used to determine whether the encryption key decrypted by the second device is the same as the encryption key transmitted by the first device.

Figure 19:
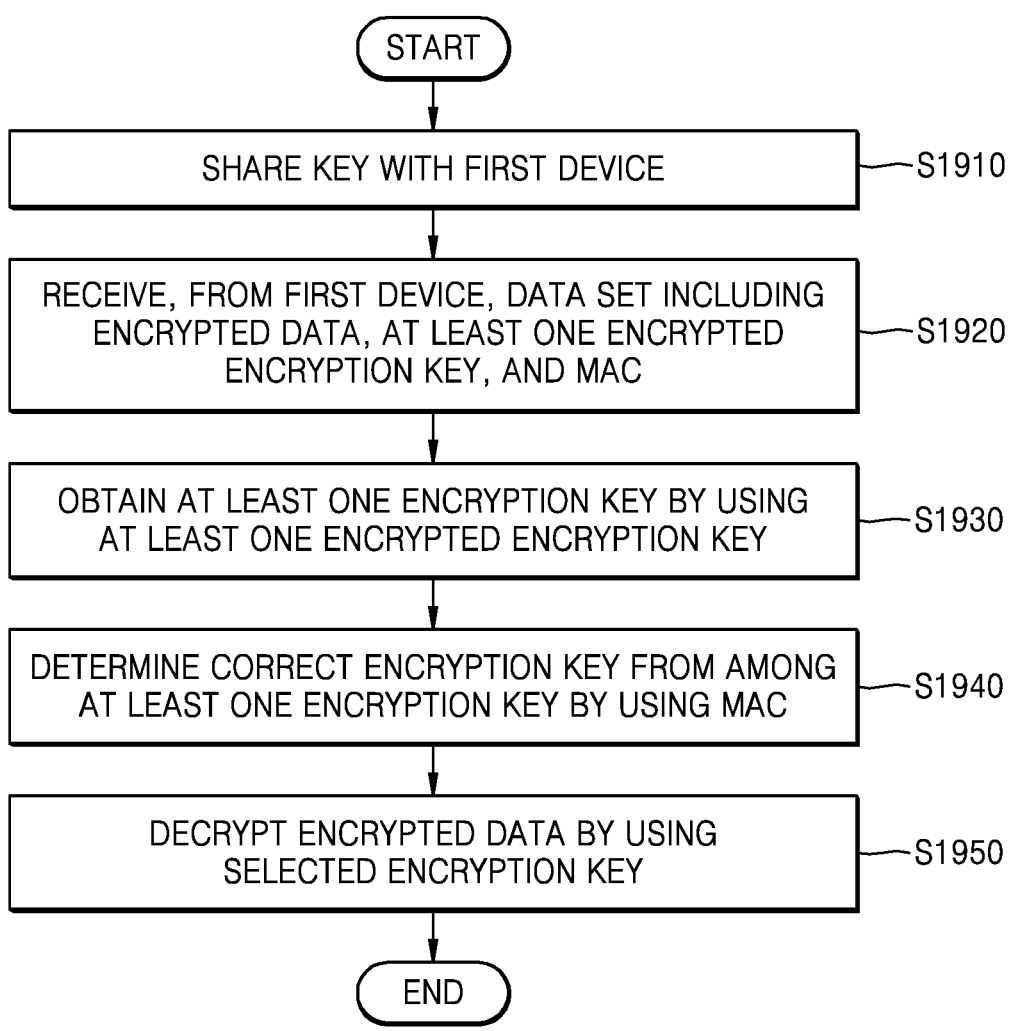
FIG. 19 is a flowchart of a method of receiving encrypted data for preventing identification of transmitting and receiving devices, according to some embodiments.

FIG. 19 is a flowchart of a method of receiving encrypted data for preventing identification of transmitting and receiving devices, according to another embodiment.

In operation 1910, a second device shares a key with a first device. According to some embodiments, the shared key may include a public key or a secret key. Also, according to some embodiments, the second device may exchange shared keys and nonces with the first device, and since descriptions thereof correspond to those above, details thereof are not provided again.

In operation 1920, the second device receives, from the first device, a data set including encrypted data, at least one encrypted encryption key, and MAC. When a plurality of devices receives encrypted data, the data set received by the second device may include a plurality of encrypted encryption keys.

In operation 1930, the second device obtains at least one encryption key by using the at least one encrypted encryption key. For example, the second device may decrypt the encrypted encryption key in the received data set by using a key selected based on key identification information (for example, at least one of the public key, the secret key, the shared key, the nonce, and identification number shared in operation 1910).

According to some embodiments, when a plurality of devices receive encrypted data, the second device may obtain a plurality of encryption keys by using a plurality of encrypted encryption keys.

In operation 1940, the second device determines a correct encryption key from among the obtained plurality of encryption keys by using the MAC. For example, the second device may generate MAC by using each of the obtained plurality of encryption keys, and compare the generated MAC and the MAC included in the received data set. The second device may select an encryption key corresponding to the generated MAC matching the MAC included in the received data set.

In operation 1950, the second device decrypts the encrypted data by using the encryption key selected in operation 1940.

Figure 20:
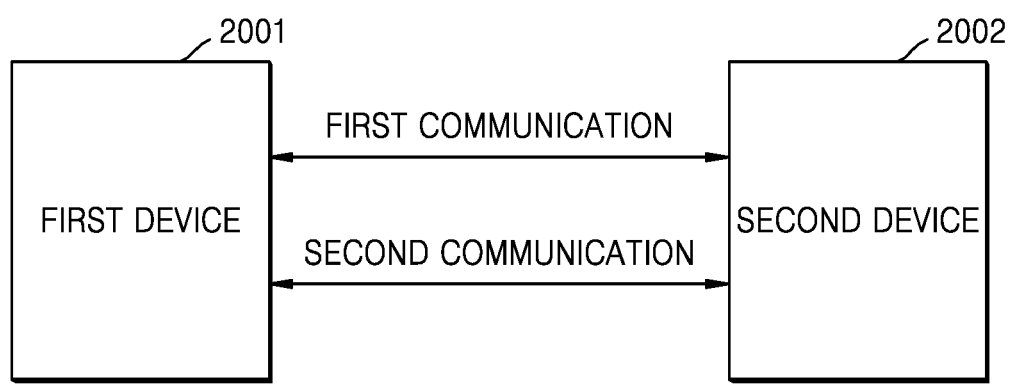
FIGS. 20 and 21 are system diagrams of a key sharing method according to some embodiments.
Figure 21:
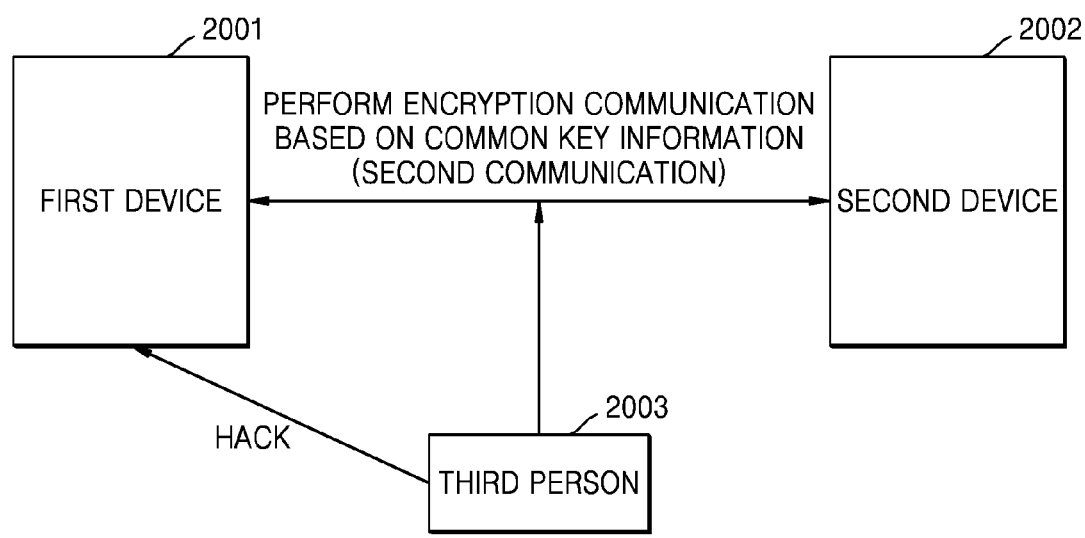

FIGS. 20 and 21 are system diagrams of a key sharing method according to some embodiments.

Referring to FIG. 20, according to some embodiments, a first device 2001 and a second device 2002 may perform first communication. For the first communication, the first and second devices 2001 and 2002 may each generate a public key and a private key, and share the generated public keys. The first and second devices 2001 and 2002 may generate an encryption key used to encrypt data exchanged therebetween, based in the shared public keys and the generated private keys.

According to some embodiments, an authentication process may be performed during the first communication between the first and second devices 2001 and 2002 in order to generate an encryption key. For example, the first and second devices 2001 and 2002 may generate and check a short authentication string (SAS) to identify each other, i.e., the first device identifies the second device and the second device identifies the first device), and generate the encryption key.

According to some embodiments, the first and second devices 2001 and 2002 may perform second communication. In other words, the first and second devices 2001 and 2002 may perform the second communication after the first communication. According to some embodiments, during the second communication, the first and second devices 2001 and 2002 do not generate and check SAS, but may identify each other based on common key information used during the first communication and generate the encryption keys. When the operation of generating and checking SAS is not performed, keys may be safely exchanged without user inconvenience.

The first and second devices 2001 and 2002 may perform encryption communication based on the common key information, during the second communication. In detail, the first and second devices 2001 and 2002 may each generate the encryption key based on the common key information. The first and second devices 2001 and 2002 may compare the generated encryption keys to check the encryption keys and perform the encryption communication based on the checked encryption keys.

After the encryption communication, the first and second devices 2001 and 2002 may delete all of the generated public keys and private keys, but may store information about the generated encryption keys for following communication. The information about the generated encryption keys may be used as common key information during third communication between the first and second devices 2001 and 2002.

However, referring to FIG. 21, since the first and second devices 2001 and 2002 store the same common key information and perform encrypted communication based on the same common key information, when a third person 2003 hacks one of the first and second devices 2001 and 2002, man-in-the middle attack (MITM) may be possible. For reference, the first communication and the second communication herein are for distinguishing a communication order, and do not denote initial communication.

Figure 22:
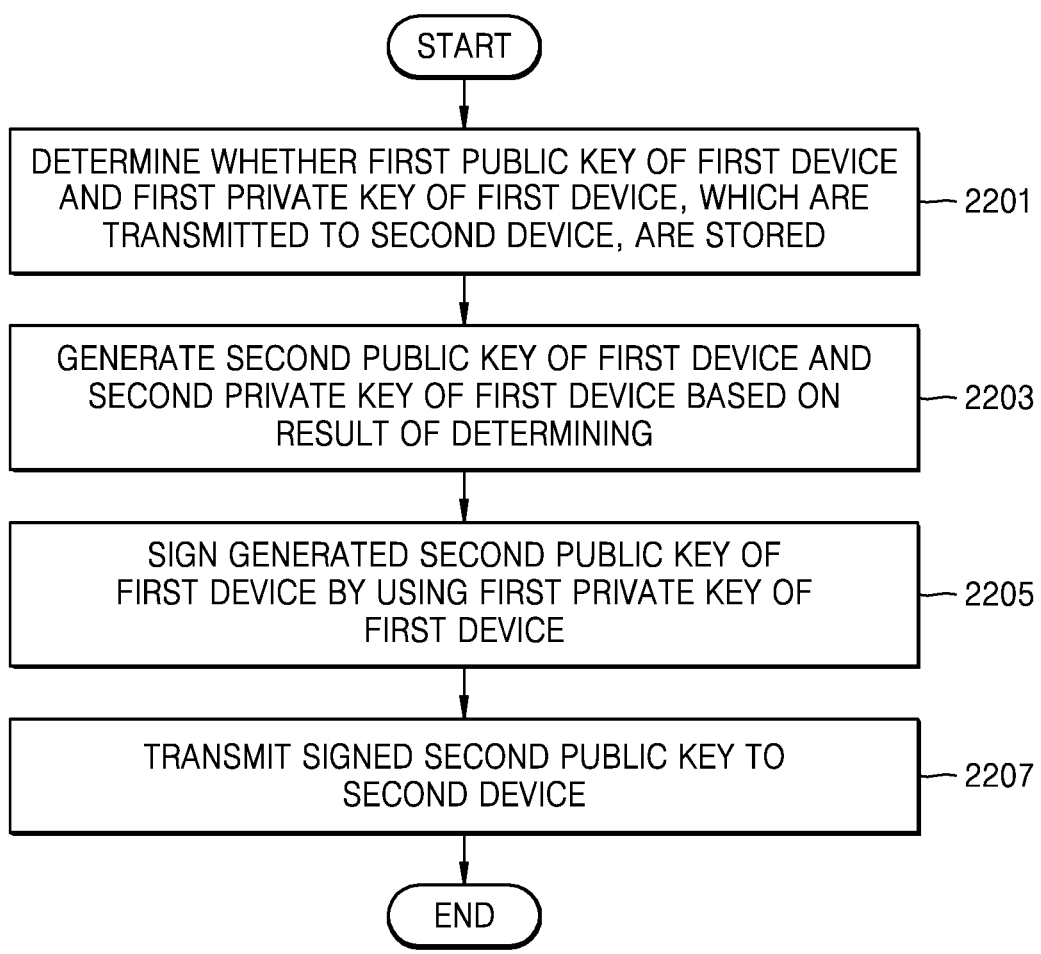
FIG. 22 is a flowchart of a key sharing method according to some embodiments.

FIG. 22 is a flowchart of a key sharing method according to some embodiments.

In operation 2201, a first device may determine whether a first public key of the first device and a first private key of the first device, which are transmitted to a second device, are stored.

According to some embodiments, the first device may receive a communication start request from the second device or a server, and determine whether communication has been performed with the second device before the communication start request based on a communication history. Also, when it is determined that the communication has been performed with the second device, the first device may determine whether the first public key of the first device and the first private key of the first device, which corresponds to the first public key of the first device, which are transmitted to the second device, are stored.

According to some embodiments, the first public key of the first device and the first private key of the first device may be keys used during the communication performed before the reception of the communication start request (previous communication). In other words, the first device may store the first public key of the first device and the first private key of the first device before the previous communication ends.

When communication has not performed with the first device before, the first device may perform SAS generating and additional authenticating procedures.

In operation 2203, the first device may generate a second public key of the first device and a second private key of the first device based on a result of the determining.

In operation 2205, the first device may sign the generated second public key of the first device by using the first private key of the first device.

According to some embodiments, the signing may mean processing of data such that its source is determined through a verifying procedure. For example, like a method where, when the first device encrypts data by using a public key, the second device decrypts the encrypted data by using a private key corresponding to the public key, when the first device signs data by using a private key, the second device may identify a device that transmitted the data by using a public key corresponding to the private key. However, an embodiment is not limited thereto, and the signing of the present disclosure may include any method displaying a source.

In operation 2207, the first device may transmit the signed second public key to the second device. According to some embodiments, the first device may transmit, together with the signed second public key, the second public key that is not signed. The second device may verify the signed second public key and compare the signed second public key with the second public key that is not signed.

Figure 23:
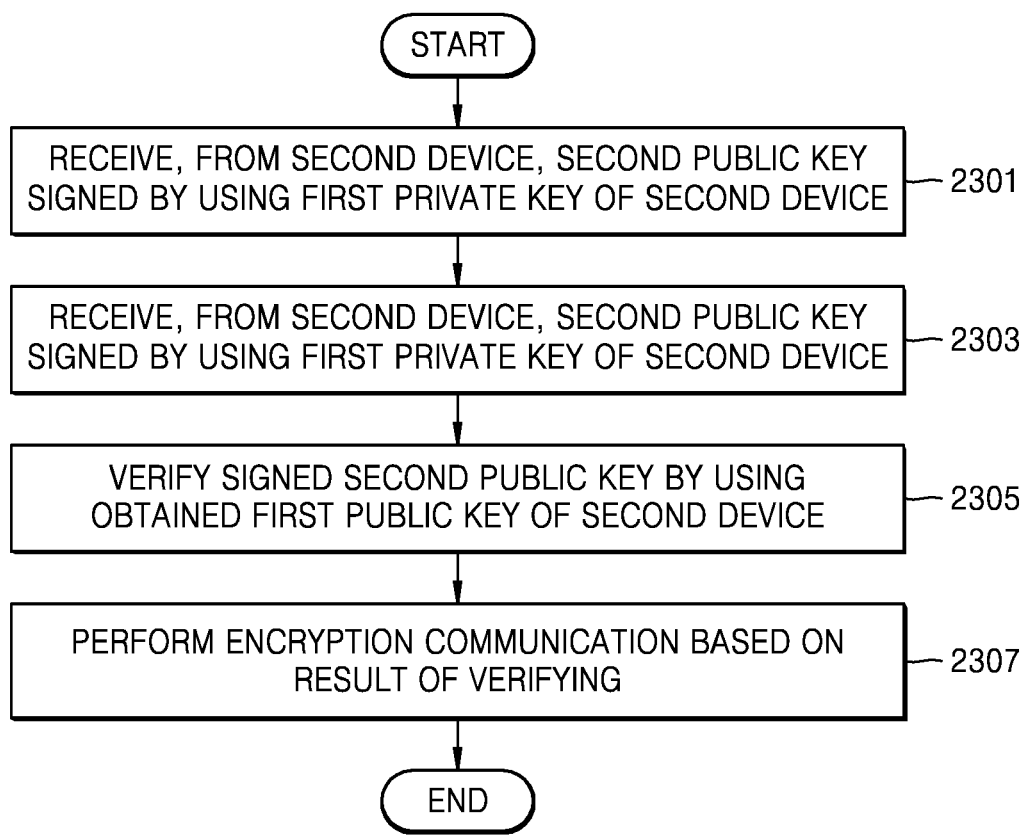
FIG. 23 is a flowchart of a key sharing and encryption key generating method according to some embodiments.

FIG. 23 is a flowchart of a key sharing and encryption key generating method according to some embodiments.

In operation 2301, a first device may receive a second public key signed by using a first private key of a second device, from the second device. According to some embodiments, a first public key of the second device and the first private key of the second device may be keys used during communication performed before reception of a communication start request (previous communication).

In operation 2303, the first device may obtain the first public key of the second device, which corresponds to the first private key of the second device, based on a communication history. According to some embodiments, the first device may obtain the first public key of the second device, which is stored in the first device. In other words, the first device may store the first public key of the second device when the previous communication ends.

In operation 2305, the first device may verify the signed second public key by using the obtained first public key of the second device. According to some embodiments, the first device may verify the signed second public device to authenticate or identify the second device.

In operation 2307, the first device may perform encryption communication based on a result of the verifying. According to some embodiments, the first device may generate an encryption key based on the result of the verifying.

For example, when the second device is authenticated as the result of verifying, the first device may generate the encryption key based on a second private key of the first device and the second public key of the second device.

According to some embodiments, the encryption key may be generated via any one of various methods. For example, a predetermined value may be obtained by calculating the second private key of the first device and the second public key of the second device, and the obtained predetermined value may be input to a key inducing function, so as to obtain data for communication encryption. The first device may use a part of the data for communication encryption as the encryption key, and use a part of the remainder of the data for communication encryption as MAC or key checking data. However, an embodiment is not limited thereto, and the encryption key may be generated by using any one of various parameters or methods.

Also, according to some embodiments, when the second device is not authenticated based on the result of verifying, the first device may perform SAS calculation. In other words, the first device may perform an additional process to authenticate the second device.

For example, the first device may perform a hash operation by using the second public key of the first device and the second public key of the second device, convert a result of the hash operation to a predetermined word, change the predetermined word to sound data (for example, voice data), and provide the sound data to the first and second devices.

The first and second devices may output the provided sound data, and users of the first and second devices may perform predetermined procedures for authentication between the first and second devices based on the sound data output from the first and second devices. Here, SAS generated by the first device does not have to be converted to sound data, and when the SAS is converted to text data, the first and second devices may output the text data provided through a display unit. In other words, an additional authenticating method through SAS is not limited.

Also, according to some embodiments, when currently performed communication ends, the first device may delete the first public key of the first device, the first private key of the first device, and the first public key of the second device, and store the second public key of the first device, the second private key of the first device, and the second public key of the second device. The stored second public key of the first device, second private key of the first device, and second public key of the second device may be used during next communication.

Figure 24:
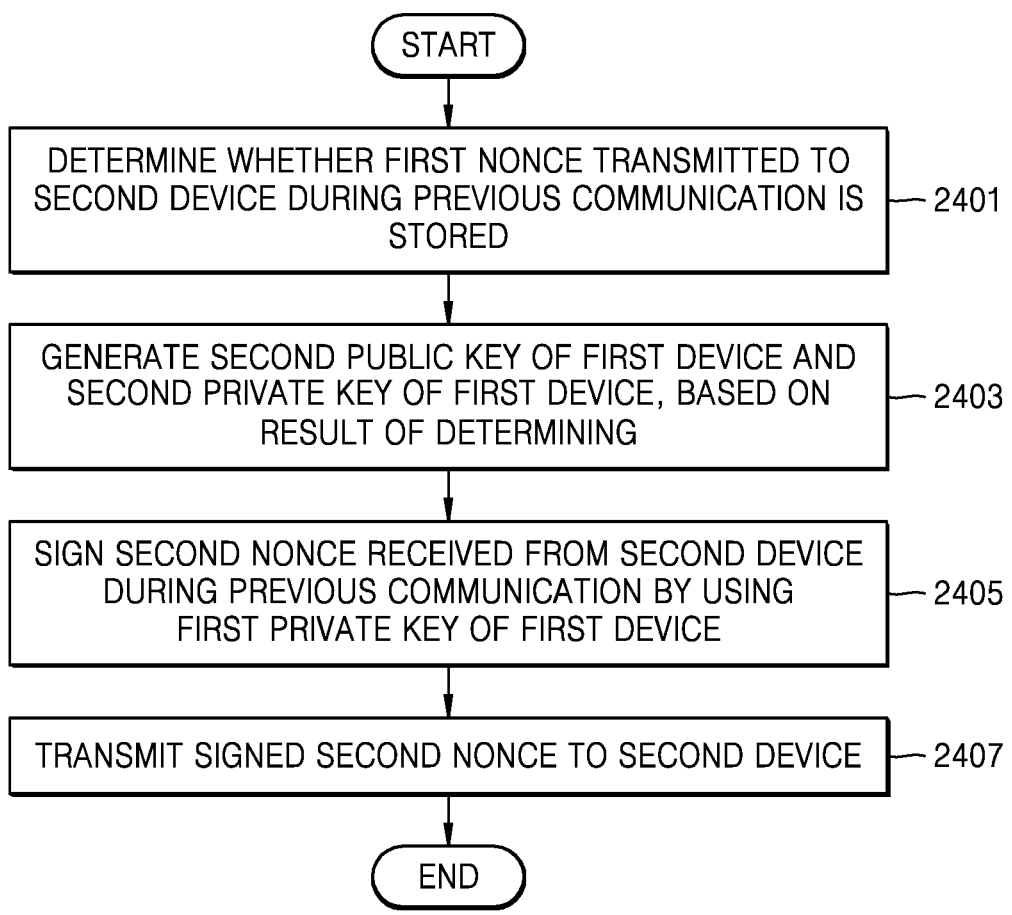
FIG. 24 is a flowchart of a key sharing method according to some embodiments.

FIG. 24 is a flowchart of a key sharing method according to some embodiments.

In operation 2401, a first device may determine whether a first nonce transmitted to a second device during previous communication is stored. According to some embodiments, the first nonce may include a nonce used during communication performed between the first and second devices before a start request of current communication. Also, the first nonce may include a nonce generated by the first device and transmitted to the second device.

In operation 2403, the first device may generate a second public key of the first device and a second private key of the first device, based on a result of the determining, as described above with reference to FIGS. 22 and 23.

In operation 2405, the first device may sign a second nonce received from the second device during the previous communication, by using a first private key of the first device. In other words, the first device may sign the second nonce received from the second device during the previous communication, by using the first private key of the first device, which was used during the previous communication.

In operation 2407, the first device may transmit the signed second nonce to the second device.

Also, according to some embodiments, the first device may transmit, together with the signed second nonce, at least one of the second public key of the first device and a hash value based on the second public key of the first device and the signed second nonce, to the second device.

Also, according to some embodiments, the first device may receive the first nonce signed by using a first private key of the second device. The first device may verify the first nonce signed by using the first private key of the second device, by using the first public key of the second device. In other words, the first and second devices may perform the key sharing method performed in FIGS. 22 and 23 by using a nonce instead of a private key used in a previous operation.

According to some embodiments, the first device may perform encrypted communication based on a result of the verifying. Since descriptions thereof correspond to those described above with reference to FIGS. 22 and 2, details thereof are not provided again.

Also, according to some embodiments, the first and second devices may respectively generate a third nonce and a fourth nonce to be used during next communication, before the currently performed communication ends, and exchange the third and fourth nonces. The first and second devices may perform key sharing during the next communication by using the exchanged nonces.

According to some embodiments, the first device may sign the fourth nonce received from the second device by using the second private key, and store the signed fourth nonce. Also, after signing the fourth nonce, the first device may delete the second private key of the first device. In other words, the first device may not store the private key.

Figure 25:
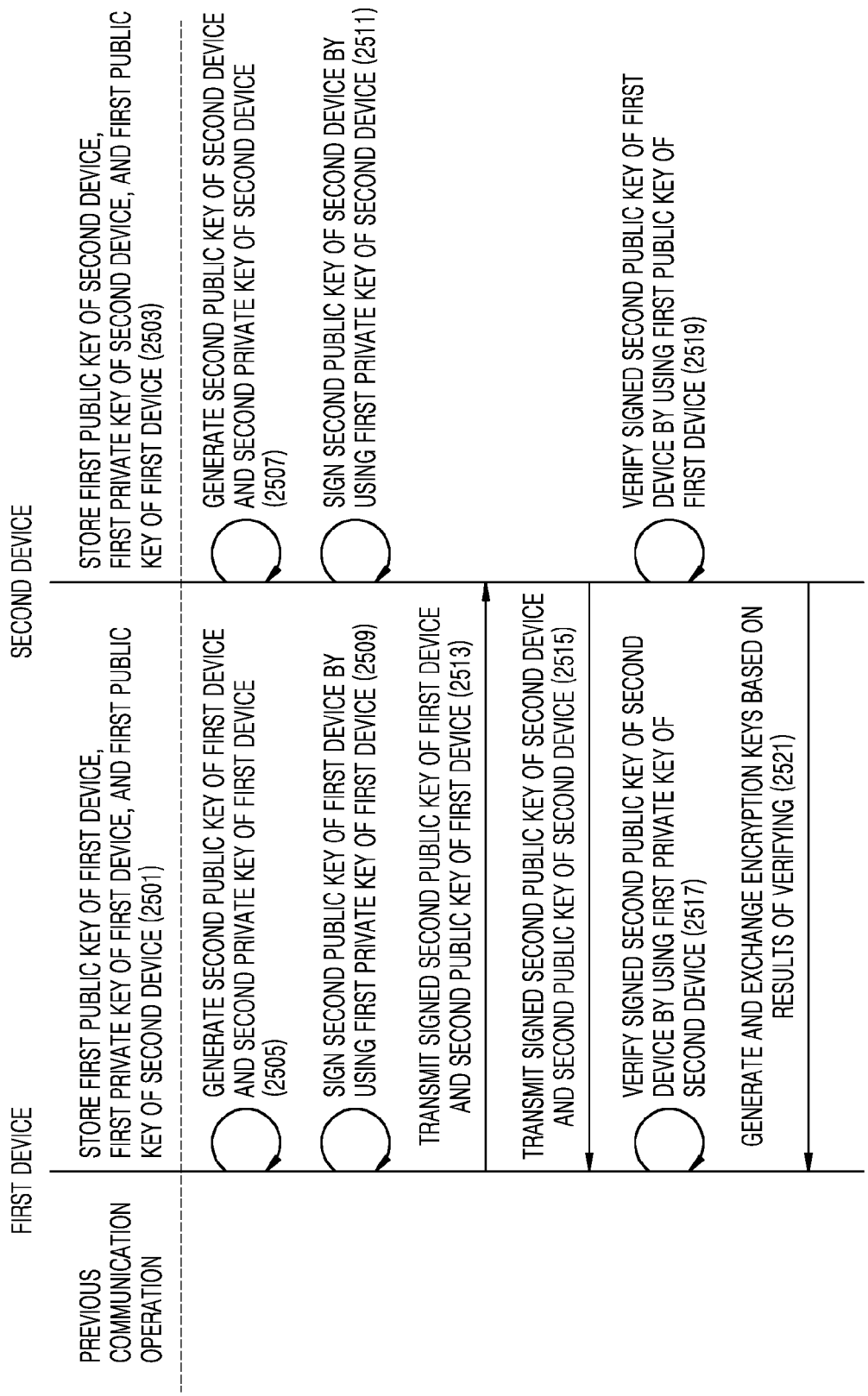
FIGS. 25 and 26 illustrate key sharing methods between a first device and a second device for encryption communication, according to some embodiments.
Figure 26:
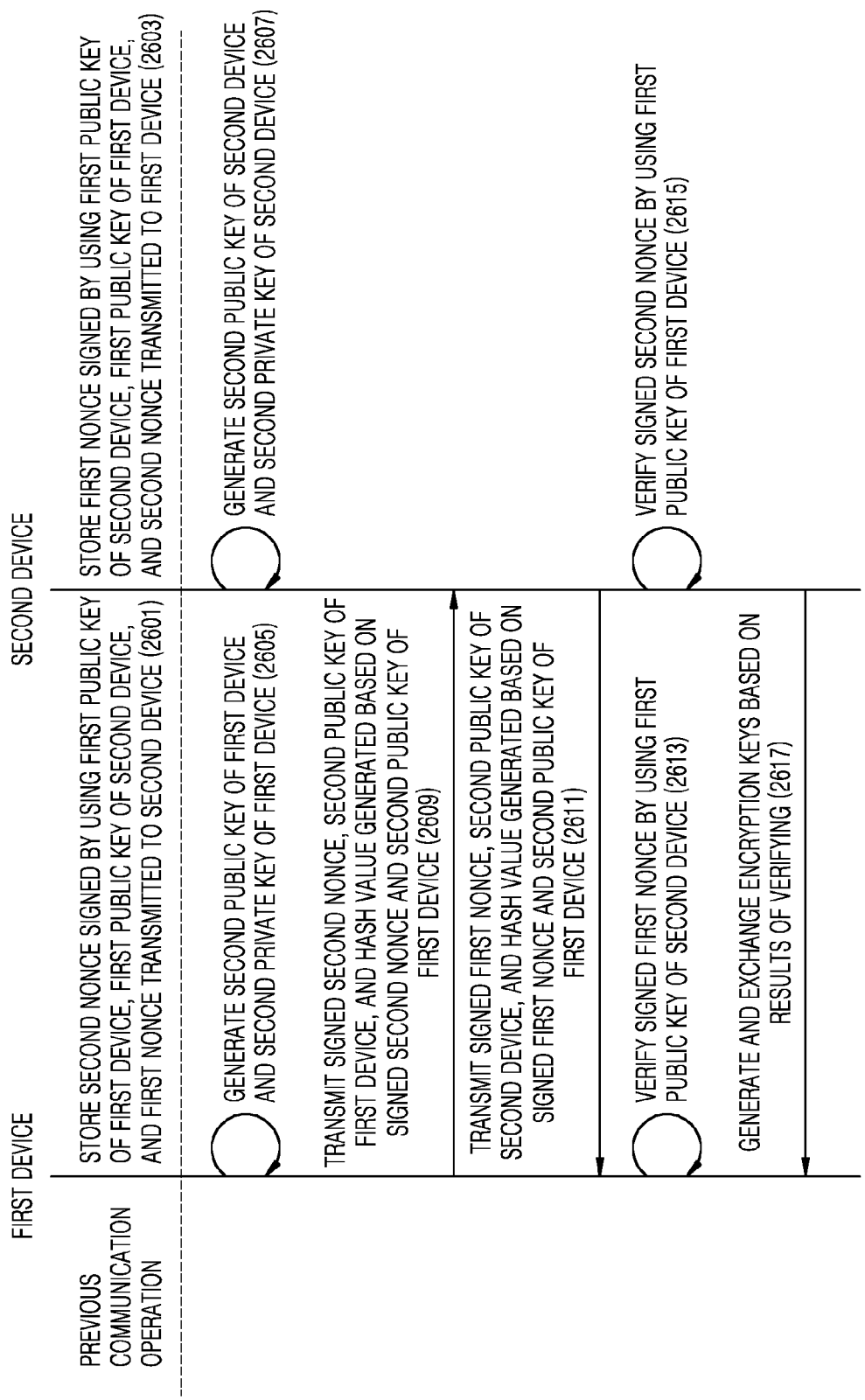

FIGS. 25 and 26 illustrate key sharing methods between a first device and a second device for encryption communication, according to some embodiments.

Referring to FIG. 25, in operation 2501, the first device may store a first public key of the first device, a first private key of the first device, and a first public key of the second device.

Also, according to some embodiments, a previous communication operation of operation 2501 may denote an operation performed during first communication described with reference to FIG. 20. Also, according to some embodiments, the first device may store the first public key of the first device, the first private key of the first device, and the first public key of the second device, and then receive a communication start request requesting to start second communication from the second device or a server.

In operation 2503, the second device may store a first public key of the second device, a first private key of the second device, and the first public key of the first device. According to some embodiments, operation 2503 may also be an operation performed during the first communication described above with reference to FIG. 20. Also, according to some embodiments, after storing the first public key of the second device, the first private key of the second device, and the first public key of the first device, the second device may transmit a communication start request requesting to start the second communication to the first device or the server.

In operation 2505, the first device may generate a second public key of the first device and a second private key of the first device.

In operation 2507, the second device may generate a second public key of the second device and a second private key of the second device.

In operation 2509, the first device may sign the second public key of the first device by using the first private key of the first device.

In operation 2511, the second device may sign the second public key of the second device by using the first private key of the second device. Since operations 2505 through 2511 correspond to descriptions of FIGS. 22 and 23, details thereof are not provided again.

In operation 2513, the first device may transmit the signed second public key of the first device and the second public key of the first device to the second device.

In operation 2515, the second device may transmit the signed second public key of the second device and the second public key of the second device to the first device.

In operation 2517, the first device may verify the signed second public key of the second device by using the first private key of the second device. According to some embodiments, a private key and a public key correspond to each other, and data encrypted by using a public key may be decrypted by using a private key, and data signed by using a private key may be verified by using a public key.

According to some embodiments, the first device may verify the signed second public key of the second device by using the first public key of the second device stored in operation 2501. Also, the first device may compare the verified second public key of the second device and the received second public key of the second device.

In operation 2519, the second device may verify the signed first public key of the first device by using the first public key of the first device. According to some embodiments, the second device may verify the signed second public key of the first device by using the first public key of the first device stored in operation 2503. Also, the second device may compare the verified second public key of the first device and the received second public key of the first device.

In operation 2521, the first device and the second device may generate and exchange encryption keys based on results of the verifying. Since the generating and exchanging of the encryption keys has been described above, details thereof are not provided again.

Referring to FIG. 26, in operation 2601, the first device may store a first nonce transmitted to the second device, a second nonce signed by using the first public key of the first device, and the first public key of the second device.

According to some embodiments, the second nonce may include a nonce received by the first device during a previous communication operation, from the second device.

The previous communication operation in operation 2601 may be an operation performed during the first communication described with reference to FIG. 20. Also, according to some embodiments, the first device may receive a communication start request requesting to start the second communication from the second device or the server, after storing the first nonce transmitted to the second device, the second nonce signed by using the first public key of the first device, and the first public key of the second device.

In operation 2603, the second device may store the first nonce signed by using the first public key of the second device, the second nonce transmitted to the first device, and the first public key of the first device.

The previous communication operation in operation 2603 may be an operation performed during the first communication described with reference to FIG. 20. Also, according to some embodiments, the second device may transmit the communication start request requesting to start the second communication to the first device or the server, after storing the second nonce transmitted to the first device, the first nonce signed by using the first public key of the second device, and the first public key of the first device.

In operation 2605, the first device may generate the second public key of the first device and the second private key of the first device.

In operation 2607, the second device may generate the second public key of the second device and the second private key of the second device.

In operation 2609, the first device may transmit the signed second nonce, the second public key of the first device, and a hash value generated based on the signed second nonce and the second public key of the first device, to the second device.

According to some embodiments, the hash value transmitted by the first device may be used by the second device to verify the first device. In addition, the first device may generate the hash value by further considering a pin number of the first device.

In operation 2611, the second device may transmit the signed first nonce, the second public key of the second device, and a hash value generated based on the signed first nonce and the second public key of the second device.

According to some embodiments, the hash value transmitted by the second device may be used by the first device to verify the second device. In addition, the second device may generate the hash value by further considering a pin number of the second device.

In operation 2613, the first device may verify the signed first nonce by using the first public key of the second device.

In operation 2615, the second device may verify the signed second nonce by using the first public key of the first device.

In operation 2617, the first and second devices may generate and exchange encryption keys based on results of the verifying. Since operations 2613 through 2617 correspond to previous descriptions, details thereof are not provided again.

Figure 27:
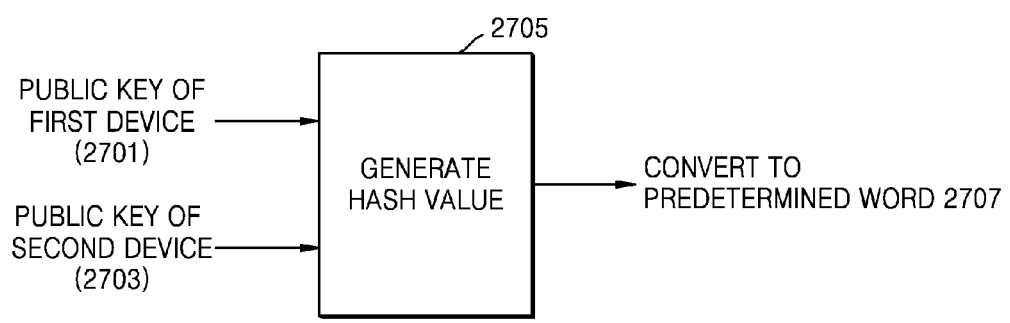
FIG. 27 illustrates a short authentication string (SAS) generating method according to some embodiments.

FIG. 27 illustrates a SAS generating method according to some embodiments.

According to some embodiments, a first device may generate a hash value 2705 by inputting a public key 2701 of the first device and a public key 2703 of a second device to a hash function. According to some embodiments, the second device may also generate a hash value in the same manner as the first device.

According to some embodiments, the first device may generate the hash value 2705, and convert the generated hash value to a predetermined word 2707. The first device may transmit the predetermined word 2707 to the second device.

According to some embodiments, the first device and the second device may output the predetermined word 2707 respectively to a user of the first device and a user of the second device, and receive a user input based on the output predetermined word 2707, and accordingly, the first and second devices may perform mutual authenticating procedures.

Figure 28:
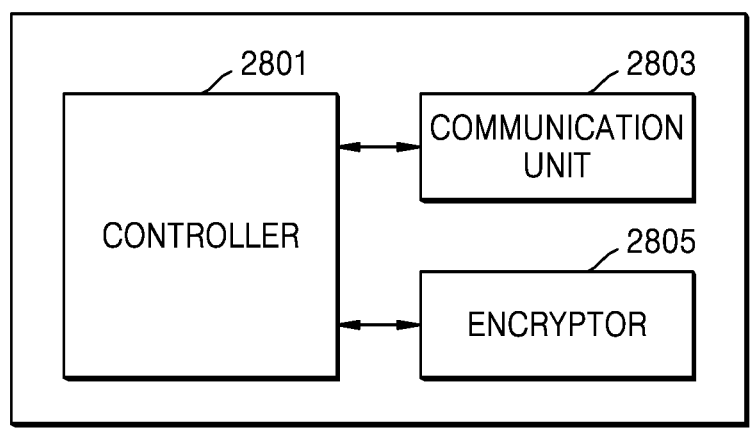
FIG. 28 is a block diagram of a key sharing device according to some embodiments.

FIG. 28 is a block diagram of a key sharing device according to some embodiments.

As shown in FIG. 28, the first device 101 that is a device into which watermark data is inserted, according to some embodiments, may include a controller 2801, a communication unit 2803, and a encryption unit 2805. However, components shown in FIG. 28 are not all essential components of the first device 101. The first device 101 may be include more or less components than those shown in FIG. 28. Also, according to some embodiments, a second device may also include the same components as the first device 101.

According to some embodiments, the controller 2801 controls overall operations of the first device 101. For example, the controller 2801 may generally control the components included in the first device 101 by executing a program stored in the first device 101. Also, the controller 2801 may include at least one processor.

According to some embodiments, the controller 2801 may determine whether a public key, a private key, and a nonce are stored in the first device based on a communication history. In other words, the controller 2801 may determine whether the public key, the private key, and the nonce are stored for a next communication operation after being used during a previous communication operation, and determine whether a previous communication history with a device currently communicating exists.

According to some embodiments, the controller 2801 may determine whether a first public key of the first device, which is transmitted to the second device, and a first private key of the first device, which corresponds to the first public key of the first device, are stored, based on the communication history. Since descriptions of the public key, the private key, and the nonce are the same as those described above, details thereof are not provided again.

Also, according to some embodiments, the controller 2801 may determine whether to perform encryption communication according to a result of the verifying of the encryptor 2805. According to some embodiments, the controller 2801 may determine whether to generate an encryption key or perform SAS calculation.

According to some embodiments, the communication unit 2803 may transmit a public key, a nonce, and a signed public key to the second device. Also, the communication unit 2803 may transmit key checking data or MAC for exchanging the generated encryption key.

According to some embodiments, the communication unit 2803 may transmit a signed second public key to the second device, or may receive a second public key signed by using a first private key of the second device from the second device. Since descriptions about the public key, the nonce, and the signed public key, which are transmitted and received by the communication unit 2803 have been described above, details thereof are not provided again.

Also, according to some embodiments, the communication unit 2803 may transmit or receive a communication start request. As described above, sharing and exchanging may include both receiving and transmitting operations.

According to some embodiments, the encryptor 2805 may sign, verify, encrypt, or decrypt predetermined data, such as a public key. According to some embodiments, the encryptor may generate a second public key of the first device and a second private key of the first device, and sign the generated second public key of the first device by using the first private key of the first device. Also, the encryptor 2805 may obtain a first public key of the second device, which corresponds to a first private key of the second device, based on the communication history, and verify the signed second public key by using the obtained first public key of the second device. Since the signing, verifying, encrypting, and decrypting operations of the encryptor 2705 corresponds to those described above, details thereof are not provided again.

According to some embodiments, the encryptor 2805 may delete data stored after the previous communication when the currently performed communication ends. For example, the encryptor 2805 may delete the first private key of the first device, the first public key of the first device, and the first public key of the second device, which were used during the previous communication, as described above.

Also, according to some embodiments, according to the result of verifying, the encryptor 2805 may generate an encryption key or perform SAS calculation according to control of the controller 2801. The generating of the encryption key and performing of SAS calculation correspond to those described above.

Figure 29:
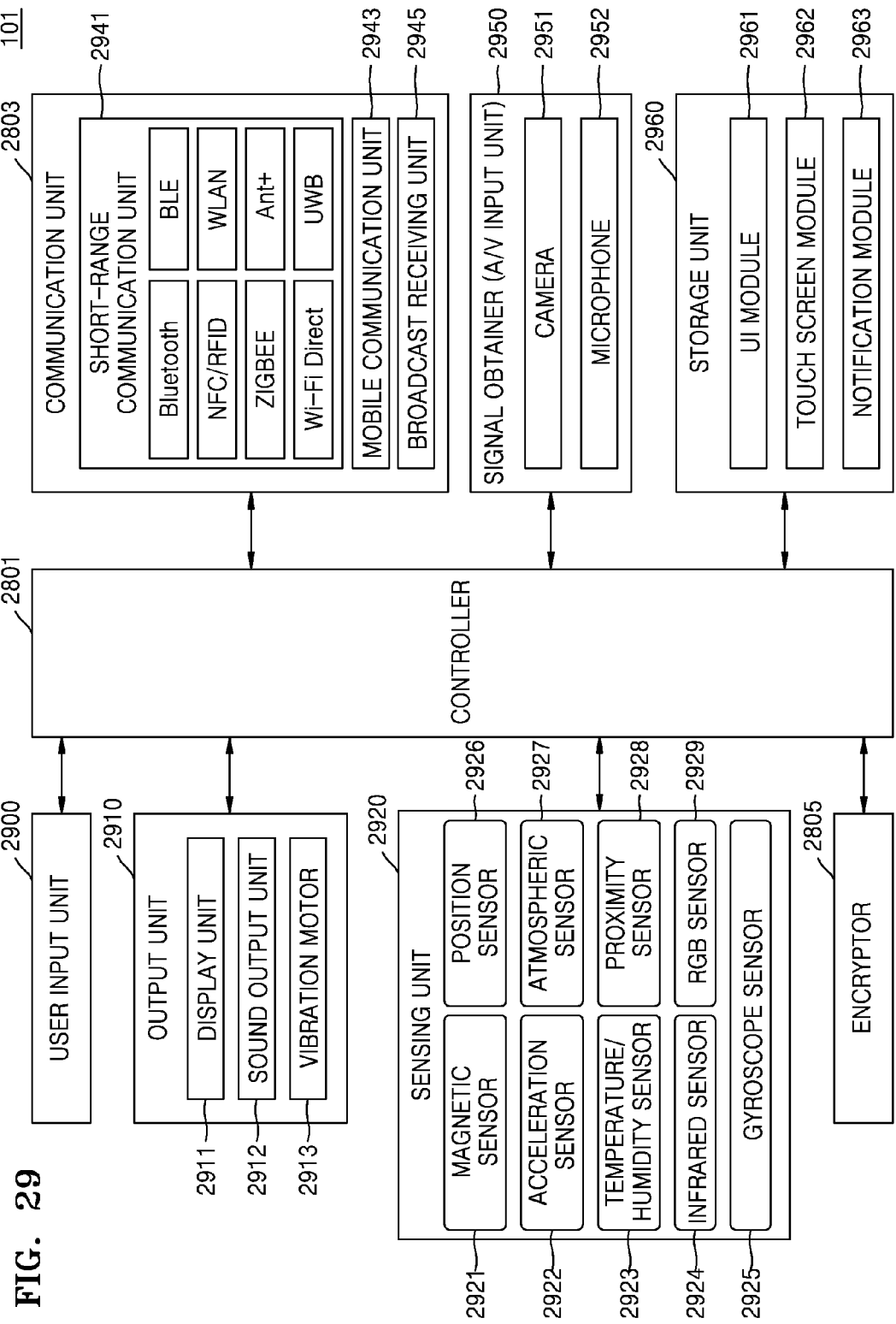
FIG. 29 is a detail block diagram of a key sharing device according to some embodiments.

FIG. 29 is a detail block diagram of a key sharing device according to some embodiments.

As shown in FIG. 29, the first device 101, i.e., the key sharing device according to some embodiments, may further include a user input unit 2900, an output unit 2910, a sensor unit 2920, an audio/video (A/V) input unit 2950, and a storage unit 2960, in addition to the controller 2801, the communication unit 2803, and the encryptor 2805.

The communication unit 2803 may include at least one component enabling the first device 101 to communicate with the second device 102 or an external server. For example, the communication unit 2803 may include a short-range communication unit 2941, a mobile communication unit 2943, and a broadcast receiving unit 2945.

According to some embodiments, the short-range communication unit 2941 may include a Bluetooth communication unit, a Bluetooth low energy (BLE) communication unit, a NFC unit, a wireless local area network (WLAN) (Wi-Fi) communication unit, a Zigbee communication unit, an infrared data association (IrDA) communication unit, a Wi-Fi direct (WFD) communication unit, an ultra wideband (UWB) communication unit, and an Ant+communication unit, but components included in the short-range communication unit 2941 are not limited thereto.

According to some embodiments, the Ant+communication unit is a communication unit performing wireless communication using w wireless network protocol called ANT having a predetermined standard, such as Bluetooth, and uses a low power technology-based protocol. An ANT protocol is a protocol capable of storing and transmitting various types of data, such as bio-information, as a profile, and since it is obvious to one of ordinary skill in the art, details thereof are not provided here.

The mobile communication unit 2943 transmits and receives a wireless signal to and from at least one of a base station, an external terminal, and a server, on a mobile communication network. Here, a wireless signal may include data having various formats according to transmission and reception of a voice call signal, a video telephone call signal, or a text/multimedia message.

The broadcast receiving unit 2945 receives a broadcast signal and/or broadcast related information from an external source, through a broadcast channel. The broadcast channel may include a satellite channel or a terrestrial broadcasting channel. According to an embodiment, the first device 101 may not include the broadcast receiving unit 2945.

The storage unit (memory 2960 may store programs for processes and controls of the controller 2801, and may store data input to or output from the first device 101. Also, according to some embodiments, the storage unit 2960 may store a public key, a private key, a nonce.

The storage unit 2960 may include at least one type of storage medium from among a flash memory, a hard disk, a multimedia card micro type memory, a card type memory (for example, a secure digital (SD) card or an extreme digital (XD) card), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Programs stored in the storage unit (memory) 2960 may be classified into a plurality of modules based on functions, and may be classified into a UI module 2961, a touch screen module 2962, and a notification module 2963.

The UI module 2961 may provide a specialized UI or GUI linked to the first device 101. For example, the UI module 2961 may provide a UI or GUI to determine whether procedures for the first device 101 to communicate with the second device 102 are being performed.

The touch screen module 2963 may detect a touch gesture of a user on a touch screen, and transmit information about the touch gesture to the controller 2904. The touch screen module 2962 according to some embodiments may recognize and analyze a touch code. The touch screen module 2962 may be configured as separate hardware including a controller.

Various sensors may be disposed inside or around the touch screen to detect a touch or a proximity touch on the touch screen. An example of a sensor for detecting a touch on the touch screen includes a tactile sensor. The tactile sensor detects a contact that can be felt by a person on a certain object. The tactile sensor may detect various types of information, such as a roughness of a contact surface, a rigidness of a contact object, and a temperature of a touch point.

Another example of a sensor for detecting a touch on the touch screen includes a proximity sensor.

The proximity sensor detects an existence of an object approaching or near a predetermined detection surface by using electromagnetic field force or infrared ray, without having to detect a mechanical contact. Examples of the proximity sensor include a transmission photoelectric sensor, a direct reflective type photoelectric sensor, a mirror reflective type photoelectric sensor, a high frequency oscillation proximity sensor, a capacitance type proximity sensor, a magnetic type proximity sensor, and an infrared proximity sensor. According to some embodiments, the first device 101 may obtain distance information with the second device by using the proximity sensor.

Examples of a touch gesture of a user include tap, touch and hold, double-tap, drag, panning, flick, drag-and-drop, and swipe.

The notification module 2963 may generate a signal for notifying event generation in the first device 101. Examples of an event that is generated in the first device 101 include call signal reception, a message reception, key signal input, and schedule notification. The notification module 2963 may output a notification signal in a video signal format through a display unit 2911, in an audio signal format through a sound output unit 2912, or in a vibration signal format through a vibration motor 2913. Since operations performed by the storage unit (memory) 2960 correspond to those described above, details thereof are not provided again.

The controller 2801 controls overall operations of the first device 101. Since descriptions thereof are same as those above, details thereof are not provided again.

The user input unit 2900 is used by a user to input data for controlling the first device 101. Examples of the user input unit 2900 include a keypad, a dome switch, a touch pad (a touch capacitance type, a pressure resistance film type, an infrared light detecting type, a surface ultrasound conducting type, an integral tension measuring type, or a piezo-effect type), a jog wheel, and a jog switch, but are not limited thereto.

The output unit 2910 may output an audio signal, a video signal, or a vibration signal, and may include the display unit 2911, the sound output unit 2912, and the vibration motor 2913.

The display unit 2911 may display information processed by the first device 101.

Meanwhile, when the display unit 2911 is configured as a touch screen by forming a layer structure with a touch pad, the display unit 2911 may also be used as an input device as well as an output device. The display unit 2911 may include at least one of a liquid crystal display (LCD), a thin-film transistor-liquid crystal display (TFT-LCD), an organic light-emitting diode (OLED), a flexible display, a 3D display, and an electrophoretic display. Also, according to an embodiment of the first device 101, the first device 101 may include at least two display units 2911. Here, the at least two display units 2911 may be disposed to face each other by using a hinge.

The sound output unit 2912 outputs audio data received from the communication unit 2803 or stored in the storage unit (memory) 2960. Also, the sound output unit 2912 outputs a sound signal related to a function performed by the first device 101, such as a call signal reception sound, a message reception sound, or an alarm sound. The sound output unit 2912 may include a speaker or a buzzer.

The vibration motor 2913 may output a vibration signal. For example, the vibration motor 2913 may output a vibration signal corresponding to an output of audio data or video data, for example, a call signal reception sound or a message reception sound. Also, the vibration motor 2913 may output a vibration signal when a touch screen is touched.

The sensor unit 2920 may detect a state of the first device 101 or a state around the first device 101, and transmit the detected state to the controller 2801.

The sensing unit 2920 may include at least one of a magnetic sensor 2921, an acceleration sensor 2922, a temperature/humidity sensor 2923, an infrared sensor 2924, a gyroscope sensor 2925, a position sensor 2926 such as GPS, an atmospheric sensor 2927, a proximity sensor 2928, and an red, green, blue (RGB) sensor 2929 such as an illuminance sensor, but a component included in the sensing unit 140 is not limited thereto. Because functions of each sensor may be intuitively inferred by one of ordinary skill in the art based on its name, details thereof are not described herein.

The signal obtainer (A/V input unit) 2950 is used to receive an audio signal or a video signal, and may include a camera 2951 and a sound input unit 2952. The camera 2951 may obtain an image frame of a still image or a moving image via an image sensor in a video telephone mode or a photographing mode. An image captured via the image sensor may be processed by the controller 2801 or a separate image processor (not shown).

An image frame processed by the camera 2951 may be stored in the storage unit (memory) 2960 or transmitted to an external device through the communication unit 2803. According to an embodiment of a terminal, there may be at least two cameras 2951.

The sound input unit 2952 receives an external sound signal and processes the external sound signal to electric voice data. According to some embodiments, the sound input unit 2952 may be a microphone, but is not limited thereto. The sound input unit 2952 may receive a sound signal from an external device, a server, or a user. The sound input unit 2952 may use any one of various noise removing algorithms to remove noise generated while receiving the external sound signal.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the preferred embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present disclosure could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a" and "an", and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the present disclosure.

The invention claimed is:

1. A method of transmitting, by a first device, encrypted data, the method comprising:
    generating an encryption key for encrypting data to be transmitted;
    generating key identification information by using the generated encryption key;
    encrypting the data to be transmitted by using the generated encryption key; and
    transmitting a data set including the encrypted data and the key identification information to a second device,
    wherein the key identification information comprises identification information of the first device, which is identifiable by the second device, or information for identifying the encryption key,
    wherein the method further comprises transmitting a first nonce to the second device and receiving a second nonce from the second device, wherein the key identification information is generated by using in the first nonce, the second nonce, and the encryption key, and wherein the key identification information comprises information for identifying the first device based on the first nonce or the second nonce.

2. The method of claim 1, wherein the generating of the encryption key comprises:

transmitting a public key of the first device to the second device and receiving a public key of the second device from the second device; and generating the encryption key by using the public key of the first device and the public key of the second device.

3. The method of claim 1, wherein the generating of the key identification information comprises:

receiving a public key of the second device from the second device; and generating the key identification information by encrypting the encryption key by using the received public key of the second device.

4. The method of claim 1, wherein the generating of the encryption key comprises:

sharing a secret key with the second device; and generating the encryption key by using the secret key and the first nonce, wherein the key identification information comprises the first nonce and a value obtained by key-hashing, by using the first nonce, a value in which the first nonce and the encryption key are combined.

5. A method of receiving, by a second device, encrypted data, the method comprising:

receiving a data set comprising encrypted data and key identification information from a first device;

obtaining an encryption key with respect to the first device by using the key identification information;

decrypting the encrypted data by using the obtained encryption key, wherein the key identification information comprises information of the first device, which is identifiable by the second device, and information for identifying the encryption key, wherein the method further comprises receiving at least one nonce from at least one device comprising the first device, and transmitting a second nonce to each of the at least one device, and wherein the key identification information comprises information for identifying the first device based on the at least one nonce or the second nonce.

6. The method of claim 5, further comprising receiving each of at least one public key from at least one device comprising the first device, and transmitting a public key of the second device to each of the at least one device, wherein the obtaining of the encryption key with respect to the first device comprises:

generating at least one encryption key with respect to the at least one device by using the received at least one public key and the public key of the second device;

generating at least one piece of key identification information by using the at least one encryption key;

identifying the first device that transmitted the encrypted data by comparing the generated at least one piece of key identification information and the received key identification information; and obtaining the encryption key with respect to the identified first device.

7. The method of claim 5, further comprising sharing at least one secret key with at least one device comprising the first device, wherein the receiving of the data set comprises receiving encrypted data and key identification information from the first device from among the at least one device, the key identification information comprises a first nonce of the first device and a value obtained by key-hashing the encryption key by using the first nonce, the encryption key comprises information generated by combining the first nonce and a secret key shared with the first device, and the obtaining of the encryption key with respect to the first device comprises:

generating at least one matching key by key-hashing, by using the first nonce, each of at least one value in which the at least one secret key and the first nonce are combined;

identifying the first device that transmitted the data set by comparing the generated at least one matching key and a value obtained by key-hashing the encryption key by using the first nonce; and obtaining the encryption key of the first device.

8. A first device transmitting encrypted data, the first device comprising:

a controller configured to generate an encryption key, generate key identification information by using the generated encryption key, and encrypt data; and a transceiver configured to transmit a data set comprising the encrypted data and the key identification information to a second device, wherein the key identification information comprises information of the first device, which is identifiable by the second device, and information for identifying the encryption key, wherein the transceiver is further configured to transmit a first nonce to the second device, and receive a second nonce from the second device, and wherein the key identification information comprises information for identifying the first device based on the first nonce or the second nonce.

9. The first device of claim 8, wherein the transceiver is further configured to transmit a public key of the first device to the second device, and receive a public key of the second device from the second device, the controller is further configured to generate the encryption key by using the public key of the first device and the public key of the second device, and the key identification information is generated by using the first nonce, the second nonce, and the encryption key.

10. The first device of claim 8, wherein the transceiver is further configured to receive a public key of the second device from the second device, and the key identification information is generated by encrypting the encryption key by using the public key of the second device.

11. A method of sharing, by a first device, a key for encrypted data transmission, the method comprising:

determining, based on a communication history, whether a first public key of a first device transmitted to a second device, and a first private key of the first device corresponding to the first public key of the first device, are stored;

generating a second public key of the first device and a second private key of the first device based on a result of the determining;

signing the generated second public key of the first device with the first private key of the first device;

transmitting the signed second public key to the second device;

receiving, from the second device, a second public key of the second device, which is signed with a first private key of the second device;

obtaining a first public key of the second device, which corresponds to the first private key of the second device, based on the communication history;

verifying the signed second public key by using the obtained first public key of the second device; and performing encryption communication based on a result of the verifying.

12. The method of claim 11, wherein the first public key of the first device and the first private key of the first device are used during communication between the first device and the second device.

13. The method of claim 11, wherein the determining comprises determining whether a first nonce transmitted to the second device during a previous communication is stored based on the communication history, wherein the signing comprises signing a second nonce received from the second device during the previous communication based on the communication history, with the first private key of the first device, and wherein the transmitting comprises transmitting the signed second nonce.

14. A non-transitory computer-readable recording medium having recorded thereon a program which, when executed by a computer, performs the method of claim 1.

* * * * *